(12) United States Patent
Desai et al.

(10) Patent No.: US 11,792,506 B2
(45) Date of Patent: Oct. 17, 2023

(54) ELECTRONIC DEVICES AND CORRESPONDING METHODS FOR DEFINING AN IMAGE ORIENTATION OF CAPTURED IMAGES

(71) Applicant: Motorola Mobility LLC, Chicago, IL (US)

(72) Inventors: Rahul Bharat Desai, Hoffman Estates, IL (US); Amit Kumar Agrawal, Bangalore (IN); Mauricio Dias Moises, Campinas (BR)

(73) Assignee: Motorola Mobility LLC, Northfield, IL (US)

( * ) Notice: Subject to any disclaimer, the term of this patent is extended or adjusted under 35 U.S.C. 154(b) by 25 days.

(21) Appl. No.: 17/668,325

(22) Filed: Feb. 9, 2022

(65) Prior Publication Data
US 2023/0254574 A1    Aug. 10, 2023

(51) Int. Cl.
*H04N 23/60* (2023.01)
*G06T 7/73* (2017.01)
(Continued)

(52) U.S. Cl.
CPC .............. *H04N 23/64* (2023.01); *G06T 7/73* (2017.01); *H04N 23/611* (2023.01); *H04N 23/631* (2023.01); *G06T 2207/30201* (2013.01)

(58) Field of Classification Search
CPC .... H04N 23/64; H04N 23/611; H04N 23/631; H04N 13/239; H04N 23/63; H04N 23/698; H04N 23/90; H04N 23/62; H04N 23/69; H04N 23/45; H04N 23/60; H04N 23/695; H04N 23/80; H04N 2007/145; G06T 7/73; G06T 2207/30201; G06T 19/006; G06T 7/70; G06T 2207/30244; G06T 5/50; G06T 7/74; G06T 2207/10016; G06T 7/60;
(Continued)

(56) References Cited

U.S. PATENT DOCUMENTS

| 8,723,979 | B2 * | 5/2014 | Katz | G06F 1/3203 |
| | | | | 348/222.1 |
| 8,878,773 | B1 * | 11/2014 | Bozarth | G06V 10/143 |
| | | | | 382/103 |

(Continued)

OTHER PUBLICATIONS

"Scanning Originals with Correct Orientation", Canon imageRUNNER Advance; User Guide; Unknown exact Publication Date but prior to filing of present application; Viewed online at https://oip.manual.canon/USRMA-0312-zz-CS-enGB/contents/1T0003116773.html.

(Continued)

*Primary Examiner* — Michael S Osinski
(74) *Attorney, Agent, or Firm* — Philip H. Burrus, IV

(57) ABSTRACT

An electronic device includes a device housing having a front side and a rear side, a first image capture device positioned on the front side, and a second image capture device positioned on the rear side. One or more processors of the electronic device cause, in response to user input received at a user interface requesting the second image capture device capture an image of an object, the first image capture device to capture another image of a user delivering the user input. The one or more processors then define an image orientation of the image of the object to be the same as another image orientation of the other image of the user.

17 Claims, 12 Drawing Sheets

(51) Int. Cl.
*H04N 23/611* (2023.01)
*H04N 23/63* (2023.01)

(58) Field of Classification Search
CPC .. G06V 40/171; G06V 40/161; G06V 40/172; G06V 40/165; G06V 40/174; G06V 40/166; G06V 40/20; G06V 10/82; G06V 10/143; G06V 20/20; G06V 30/142; G06V 40/18; G06V 40/19; G06V 40/28; G06V 40/67
See application file for complete search history.

(56) References Cited

U.S. PATENT DOCUMENTS

| | | | | |
|---|---|---|---|---|
| 8,896,533 | B2* | 11/2014 | Sonoda | G06F 1/1686 345/158 |
| 9,298,974 | B1* | 3/2016 | Kuo | H04N 13/239 |
| 9,538,081 | B1* | 1/2017 | Zhou | G06V 20/64 |
| 9,715,619 | B2* | 7/2017 | Murillo | G06V 30/142 |
| 9,866,820 | B1* | 1/2018 | Agrawal | H04N 13/239 |
| 9,891,706 | B2* | 2/2018 | Ha | G06F 3/013 |
| 10,027,883 | B1* | 7/2018 | Kuo | H04N 23/63 |
| 10,248,218 | B2* | 4/2019 | Katz | G06F 3/0346 |
| 10,320,962 | B1* | 6/2019 | Chang | G06F 3/1423 |
| 10,489,912 | B1* | 11/2019 | Brailovskiy | H04N 13/204 |
| 10,977,510 | B2* | 4/2021 | Nakao | G06V 10/987 |
| 11,194,997 | B1* | 12/2021 | Zhang | G06T 3/0006 |
| 11,206,450 | B2* | 12/2021 | Kawk | G06V 40/176 |
| 11,386,700 | B2* | 7/2022 | Kamio | G06V 20/40 |
| 2011/0058051 | A1* | 3/2011 | Jeon | H04N 21/4227 348/E5.043 |
| 2013/0154947 | A1* | 6/2013 | Abrams | G06F 1/1626 345/173 |
| 2014/0105468 | A1* | 4/2014 | Kawashita | H04N 1/0044 382/118 |
| 2014/0160016 | A1* | 6/2014 | Katz | G09G 5/003 345/156 |
| 2014/0300634 | A1* | 10/2014 | Cho | G06T 19/006 345/633 |
| 2014/0354689 | A1* | 12/2014 | Lee | G06T 19/006 345/633 |
| 2015/0128075 | A1* | 5/2015 | Kempinski | G06F 3/012 715/765 |
| 2016/0300100 | A1* | 10/2016 | Shen | G06V 40/67 |
| 2017/0031434 | A1* | 2/2017 | Files | G06F 3/1431 |
| 2017/0201677 | A1* | 7/2017 | Otani | H04N 23/611 |
| 2017/0374280 | A1* | 12/2017 | Chan | H04N 1/00183 |
| 2018/0204052 | A1* | 7/2018 | Li | G06V 40/171 |
| 2018/0278741 | A1* | 9/2018 | Jang | G06T 7/60 |
| 2019/0141237 | A1* | 5/2019 | Kishimoto | H04N 23/64 |
| 2019/0164310 | A1* | 5/2019 | Noble | G06T 7/73 |
| 2019/0266738 | A1* | 8/2019 | Kim | G06V 40/165 |
| 2019/0373103 | A1* | 12/2019 | Oga | H04B 1/3827 |
| 2020/0050263 | A1* | 2/2020 | Wu | G06F 3/013 |
| 2020/0065602 | A1* | 2/2020 | Ionita | H04N 23/611 |
| 2020/0167951 | A1* | 5/2020 | Nachtegall | G06T 7/74 |
| 2020/0311416 | A1* | 10/2020 | Xiong | G06T 7/593 |
| 2020/0314318 | A1* | 10/2020 | Harada | H04N 23/45 |
| 2020/0380682 | A1* | 12/2020 | Gao | G06V 10/754 |
| 2020/0400954 | A1* | 12/2020 | Tanaka | G06F 3/012 |
| 2021/0042258 | A1* | 2/2021 | Hitchins | G06F 3/167 |
| 2021/0080255 | A1* | 3/2021 | Kikuchi | G01C 15/002 |
| 2021/0112196 | A1* | 4/2021 | Lyer | H04N 23/611 |
| 2021/0201661 | A1* | 7/2021 | Al Jazaery | G08C 23/00 |
| 2021/0218589 | A1* | 7/2021 | Shimizu | H04L 51/04 |
| 2021/0297587 | A1* | 9/2021 | Kanda | H04N 23/611 |
| 2021/0298644 | A1* | 9/2021 | Chen | G06V 10/764 |
| 2022/0061659 | A1* | 3/2022 | Kulovesi | G06V 40/18 |
| 2022/0121841 | A1* | 4/2022 | Oh | G06F 18/22 |
| 2022/0155856 | A1* | 5/2022 | Agrawal | H04L 65/1059 |
| 2022/0174257 | A1* | 6/2022 | Bosworth | H04N 13/117 |
| 2022/0210318 | A1* | 6/2022 | Feng | H04N 23/695 |
| 2022/0245964 | A1* | 8/2022 | Levinski | G06V 40/166 |
| 2022/0247973 | A1* | 8/2022 | Astarabadi | G06V 10/82 |
| 2022/0253993 | A1* | 8/2022 | Nakagawa | G06T 5/50 |
| 2022/0277065 | A1* | 9/2022 | Patel | G06F 21/32 |
| 2022/0317766 | A1* | 10/2022 | Zhang | G06T 3/4053 |
| 2022/0417420 | A1* | 12/2022 | Ko | H04N 23/695 |
| 2023/0154134 | A1* | 5/2023 | Oh | G06F 3/011 382/103 |
| 2023/0188826 | A1* | 6/2023 | Wu | H04N 23/698 348/222.1 |

OTHER PUBLICATIONS

Fearn, et al., "Best Document Scanning apps of 2022", TechRadar; Unknown Exact Publication date but prior to filing of present application; Viewed online https://www.techradar.com/in/best/best-document-scanning-apps.

Keough, Ben, "The Best Mobile Scanning Apps", Unknown Exact Publication Date; Viewed Mar. 8, 2022 update online at https://www.nytimes.com/wirecutter/reviews/best-mobile-scanning-apps/.

Luqman, et al., "Mobile phone camera-based video scanning of paper documents", Proceedings of Fifth International Workshop on Camera-Based Document Analysis and Recognition; Aug. 2013; pp. 77-82; Viewed online at https://www.researchgate.net/publication/278713260_Mobile_Phone_Camera-Based_Video_Scanning_of_Paper_Documents.

* cited by examiner

ELECTRONIC DEVICES AND CORRESPONDING METHODS FOR DEFINING AN IMAGE ORIENTATION OF CAPTURED IMAGES

BACKGROUND

Technical Field

This disclosure relates generally to electronic devices, and more particularly to electronic devices having image capture devices.

Background Art

The use of portable electronic devices, such as smartphones and tablet computers, has become ubiquitous. With increasing computational power, the owners of such devices use the same not only to communicate with others, but also to manage financial accounts, track health information, manage calendaring and address book data, watch television shows and movies, interact with social media sites, engage in on-line commerce, and to surf the web.

Most of these electronic devices include some form of imager, which may include one or more cameras. As the quality of these cameras has improved, people are increasingly using the imagers in smartphones and tablet computers as their primary image capture device, eschewing traditional stand-alone image capture devices such as single-lens-reflex cameras. It would be advantageous to have methods and systems to make the image capture devices of portable electronic devices perform even more optimally so as to function in a more intuitive manner.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1A:
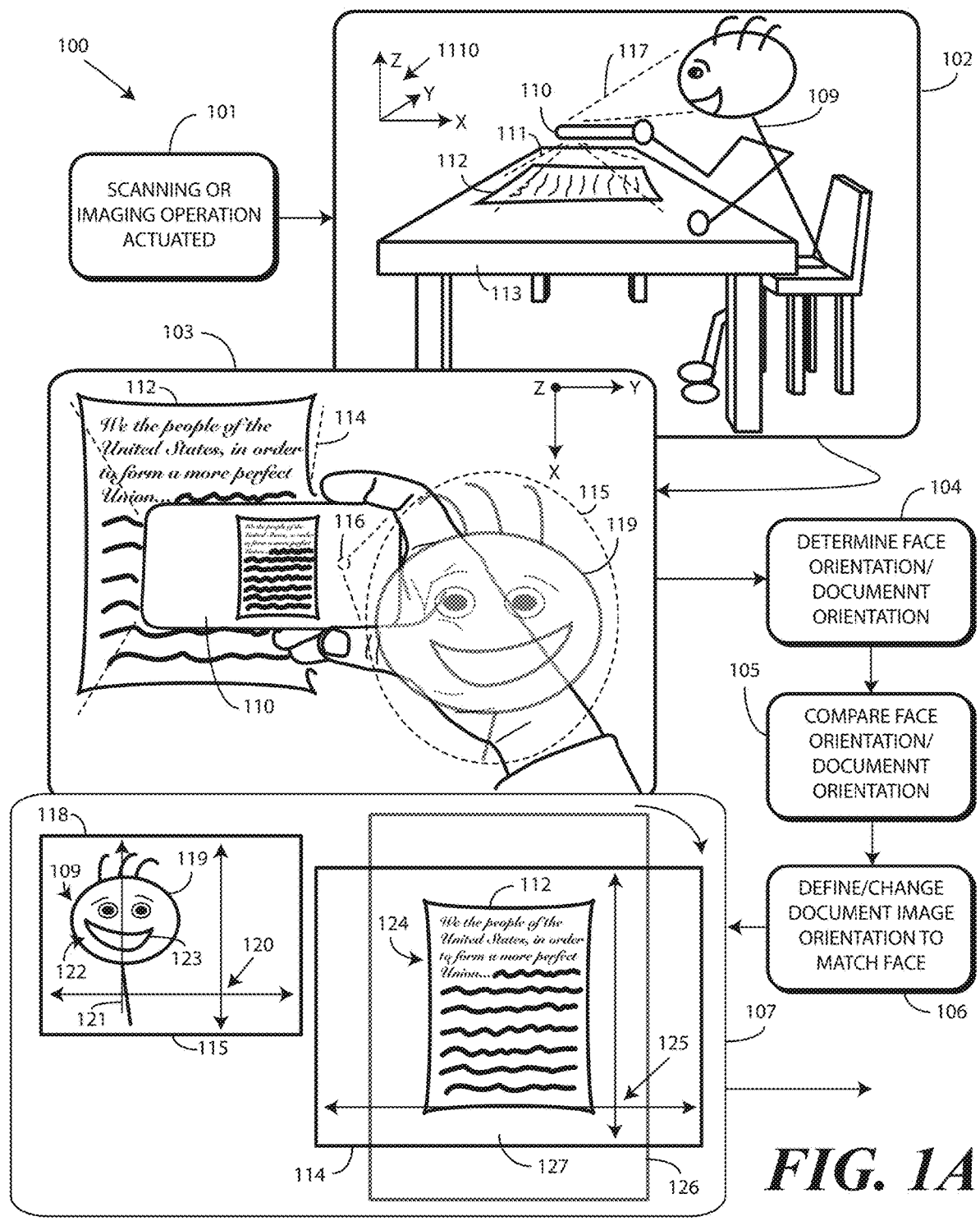
FIG. 1A illustrates one or more explanatory method steps in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to determining, with one or more processors of an electronic device, an image orientation of an image of a user of the electronic device captured with a first image capture device and defining, with the one or more processors, another image orientation associated with an image of an object captured by a second image capture device of the electronic device using the image orientation of the image of the user. Advantageously, these method steps and apparatus components allow for proper image orientation of images depicting an object when other sensors, such as an accelerometer or gyroscope, are unable to determine an orientation of the electronic device in three-dimensional space.

Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of defining an image orientation of an image of an object captured by a first image capture device as a function of another image of the user of the electronic device captured by a second image capture device as described herein. The non-processor circuits may include, but are not limited to, a radio receiver, a radio transmitter, signal drivers, clock circuits, power source circuits, and user input devices. As such, these functions may be interpreted as steps of a method to perform steps defining an image orientation of the image of the object to be the same as another image orientation of the other image of the user.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

With the increased digitization of the economy, an overall industry trend has emerged. This trend indicates that users of portable electronic devices such as smartphones, tablet computers, and the like are increasingly using these devices for document scanning processes rather than using a traditional desktop scanner. In fact, according to the U.S. Bureau of Labor Statistics, national employment in the printing industry is expected to decline by nineteen percent between 2019 and 2029. Put simply, with the incredible image quality offered by smartphone cameras, these cameras can be used as high-quality document scanners as well, thereby rendering the conventional desktop scanner with its required computer or telephone line connection essentially obsolete.

Indeed, many smartphones and tablet computers even come equipped with applications that facilitate document scanning capabilities. Illustrating by example, electronic devices manufactured by Motorola Mobility today come equipped with a "scan" feature that is operable with the on-board camera to specifically scan documents and other similar objects.

These scanning-specific applications differ from general image capture applications in that they provide features specifically tailored to scanning documents and other sheet-like objects. For instance, many scanning applications provide the ability for one or more processors of the electronic device—using image processing techniques—to locate the edges and corners of a document. These applications also allow a person to scan multiple documents automatically into one collection.

One problem associated with these applications is that they rely upon orientation detectors to determine image orientation. The one or more processors of an electronic device rely upon an accelerometer, gyroscope, other devices, or combinations thereof to determine an orientation of the electronic device in three-dimensional space. The determination of this orientation of the electronic device in three-dimensional space is required so that the one or more processors can determine whether the scanning operation is being performed with the electronic device held sideways, i.e., in landscape mode, or held vertically, i.e., in portrait mode. If, for example, an electronic device is held in a horizontal orientation with major surfaces of the electronic device held parallel to a table or other surface that serves as the platform for scanning, these sensors are frequently unable to accurately assess the orientation of the electronic device in three-dimensional space. This is true because while the sensors can detect a horizontal orientation, they cannot determine the orientation of the device relative to the document being scanned.

Figure 11A:
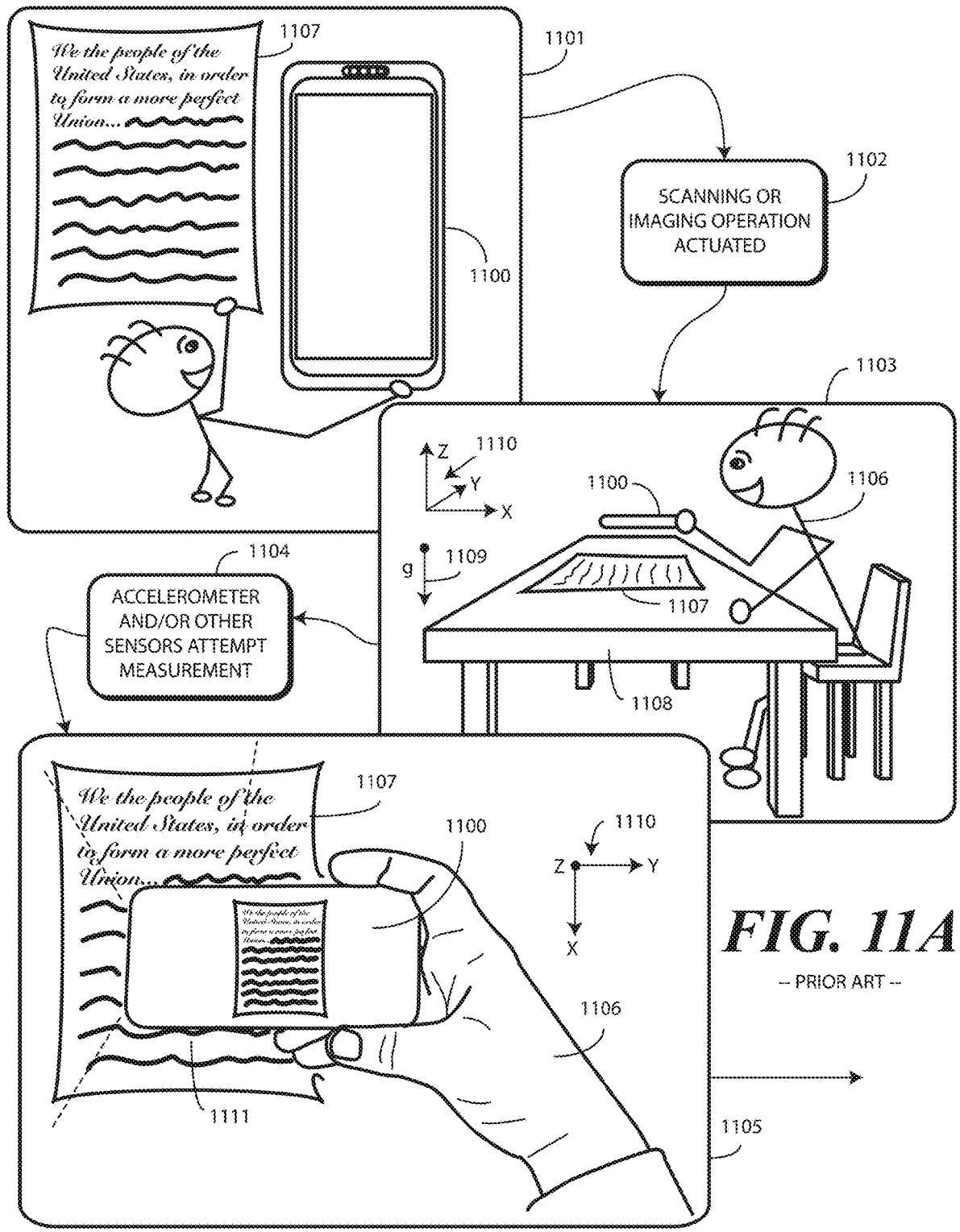
FIG. 11A illustrates one or more steps of a prior art method.
Figure 11B:
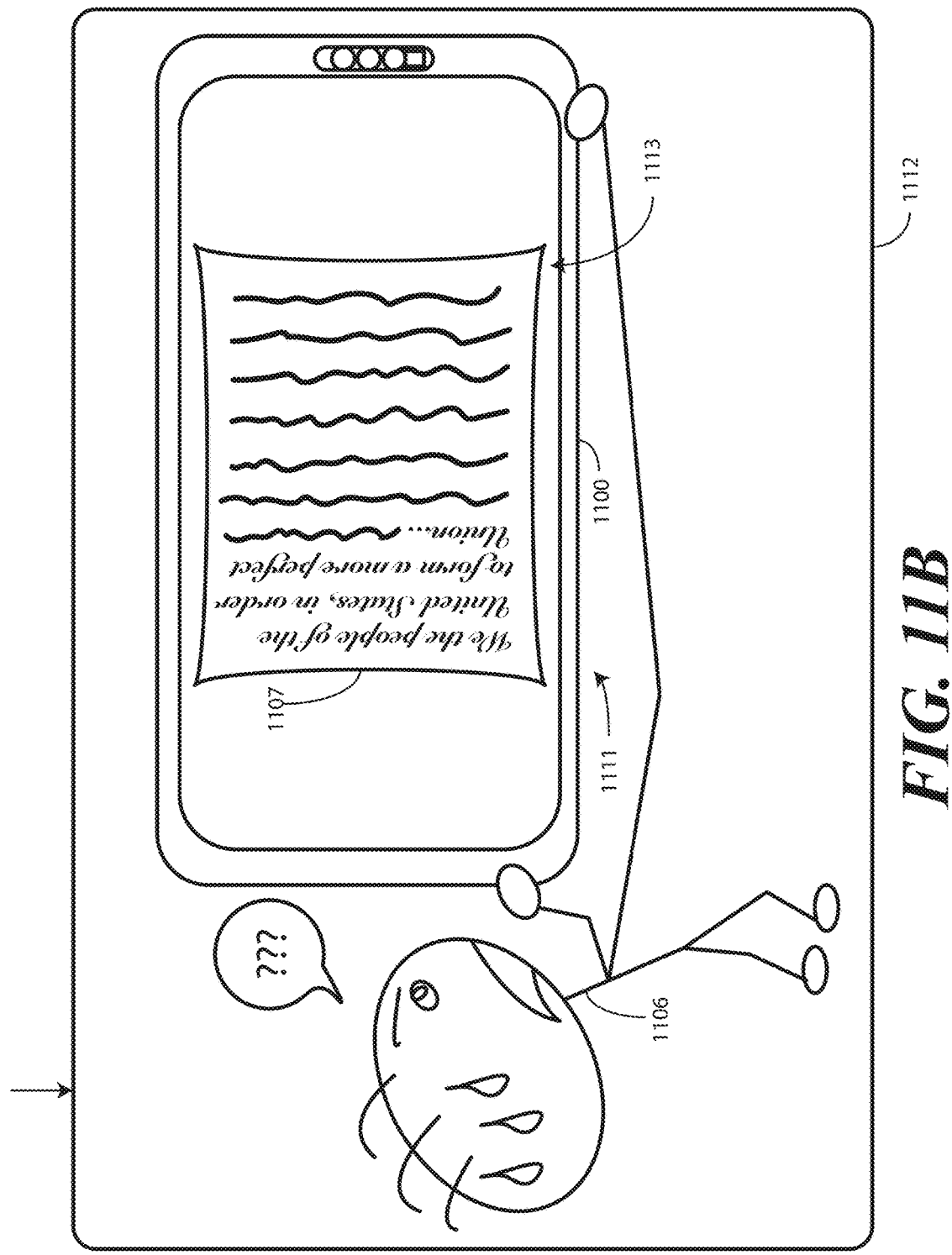
FIG. 11B illustrates one or more steps of a prior art method.

An example of what can result is shown in FIGS. 11A-11B. Turning now to FIGS. 11A-11B, at step 1101 a user 1106 of a prior art electronic device 1100 has a document 1107 they wish to scan. Accordingly, at step 1102 a scanning operation is actuated.

As shown at step 1103, the user 1106 of the electronic device 1100 has placed the document 1107 on a horizontal surface 1108, which in this example is a table. Moreover, the user 1106 of the electronic device 1100 is holding the device horizontally in three-dimensional space 1110, with a direction of gravity 1109 passing normally through major surfaces of the electronic device 1100 and the horizontal surface 1108.

At step 1104, orientation sensors of the electronic device 1100 attempt to determine the orientation of the electronic device 1100 in the three-dimensional space 1110. As shown at step 1105, the user 1106 is holding the electronic device 1100 in a landscape orientation 1111 while scanning the document 1107. Unfortunately, as noted above, while the orientation detector can detect the horizontal orientation of the electronic device 1100, it cannot determine the orientation of the electronic device 1100 relative to the document 1107 being scanned. In this example, the one or more processors of the electronic device 1100 mistakenly think that the electronic device 1100 is being held in the portrait orientation due to this error.

As shown at step 1112 of FIG. 11B, when the user 1106 then holds the electronic device 1100 with a vertical orientation with the electronic device 1100 positioned in the landscape orientation 1111 to view the resulting image 1113 depicting the document 1107, the one or more processors think the electronic device 1100 has been pivoted from the portrait orientation mistakenly detected at step 1104 of FIG. 11A to the landscape orientation 1111 of step 1112. Accordingly, the one or more processors rotate the resulting image 1113 depicting the document 1107 by ninety degrees. This causes the image 1113 showing the document 1107 to turn sideways, with text running from bottom to top.

Embodiments of the disclosure contemplate that this error serves as a key frustration for the user. Simply because the electronic device 1100 is held substantially parallel when performing the scanning operation, the orientation detectors of the electronic device 1100 were rendered incapable of detecting the orientation the document 1107 relative to the orientation about the z-axis of the electronic device 1100. While the orientation detector works well to determine the orientation when the electronic device 1100 is held vertically, as shown at step 1112 of FIG. 11B, it frequently fails—sometimes horribly—when the electronic device 1100 is held horizontally as shown at step 1103 of FIG. 11A. The problem of mistaken orientation is exacerbated when the document contains little or no text.

What often happens when this occurs is that the user 1106 tries to "shake" or otherwise violently manipulate the electronic device 1100 to obtain the correct orientation. This can cause damage to the electronic device 1100. Alternatively, the user 1106 has to execute many user input steps to manually rotate the document 1107 after completing the scanning operation. This is both cumbersome and frustrating.

Embodiments of the disclosure provide a solution to this dilemma. In one or more embodiments, a method suitable for an electronic device comprises capturing, with a first image capture device situated on a first major surface of the electronic device, an image of the object. In one or more embodiments, this image capture step constitutes a scanning operation. For example, where the object comprises a document or other similar object, the capture of the image of the object with the first image capture device can comprise capturing the image with a scanning application operable with the first image capture device.

In one or more embodiments, the method also includes capturing, with a second image capture device situated on a second major surface of the electronic device, another image of a user of the electronic device. For example, when the user holds the electronic device and requests that the image of the object be captured by the first image capture device, in one or more embodiments a second image capture device situated on the second major surface of the electronic device captures another image of the user requesting the image of the object.

In one or more embodiments, one or more processors then determine an image orientation associated with the image of the user. Using this image orientation, the one or more processors define an image orientation associated with the image of the object to be the same as the image orientation associated with the image of the user. Accordingly, if the image of the user occurred in a portrait image orientation, the image of the object will be defined to be in a portrait image orientation. Conversely, if the image of the user is in a landscape image orientation, the image of the object will be defined to be in a landscape image orientation.

The underlying assumption behind the method is that the user will align his or her face to be the same orientation as that of the document to be scanned. Said differently, the user will align their head such that the text or other indicia presented on the document is upright and legible. Thus, if the document is a check, the check will be oriented with the payee's name running left to right as seen by the user, and so forth. As a result, the relationship of the orientation of the user's face to the electronic device serves as a proxy for the orientation of the document itself in one or more embodiments.

While the advantages provided by the method and other embodiments of the disclosure are numerous, a primary advantage is that the method neither requires, nor relies upon, text detection to determine an orientation of a document. Text detection is far more computationally intensive than is determining the image orientation of an image of a user's head or torso. Accordingly, methods and electronic devices described herein are far more efficient and are quicker than are text-based detection systems. Moreover, embodiments of the disclosure do not require the knowledge of multiple languages that are necessary for text detection either. Advantageously, embodiments of the disclosure also work well to properly orient documents that include little or no text, one example of which is a hand drawing.

In one or more embodiments, an electronic device comprises a device housing having a front side and a rear side. In one or more embodiments, a first image capture device is positioned on the front side, while a second image capture device is positioned on the rear side. A user interface can be positioned on the front side or rear side and can be proximally located with the corresponding image capture device.

The electronic device includes one or more processors. In one or more embodiments, the one or more processors cause, in response to user input received at the user interface requesting the second image capture device capture an image of an object, the first image capture device to capture another image of a user delivering the user input. In one or more embodiments, the one or more processors then define an image orientation of the image of the object to be the same as another image orientation of the other image of the user. If the orientation of the image of the user is the portrait image orientation, the one or more processors define the image of the object to be in the portrait image orientation as well. If the orientation of the image of the user is the landscape image orientation, the one or more processors define the image of the object to be in the landscape image orientation, and so forth.

In one or more embodiments, this "second image of the user" feature is only occurs at some times, and does not occur at others. Illustrating by example, the use of the image of the user to determine the image orientation of the image of the object can occur only in response to a triggering event in some embodiments. If, for example, an orientation detector of the electronic device determines that the electronic device is being held substantially horizontally in three-dimensional space, the method may be implemented. Similarly, if the orientation detector is incapable of resolving the orientation of the electronic device relative to the document, an image of the user may be performed, and so forth. Other triggering events will be described below. Still others will be obvious to those of ordinary skill in the art having the benefit of this disclosure.

In one or more embodiments, one or more processors determine that a first image capture device has been actuated to scan a document placed on a scanning platform, examples of which include tables or other horizontal surfaces. The one or more processors further determine, from signals from one or more orientation detectors, that the electronic device is being held substantially horizontally or in another orientation where the orientation detector is unable to accurately ascertain whether the electronic device is being held in a portrait image orientation relative to the document or a landscape image orientation relative to the document.

The one or more processors can optionally determine that the first image capture device is situated at an end of the electronic device, which is typically on the opposite side of the electronic device from the primary display or other primary user interface.

In one or more embodiments, the one or more processors activate a second image capture device of the electronic device to detect the face of the electronic device's user using facial recognition or other similar capabilities. In one or more embodiments, the second image capture device is a front-facing or "selfie" image capture device that is on the same side of the electronic device as the primary display or other primary user interface.

In one or more embodiments, using facial recognition technology or other similar techniques, the one or more processors determine an orientation of the user's face or torso relative to the orientation of the electronic device (defined by the orientation of the sensor of the first image capture device as it is fixedly positioned along the device housing). In one or more embodiments, if the image of the user's face or torso is determined to be the portrait image orientation, the image of the document is defined to be in the portrait image orientation. If the image of the user's face or torso is determined to be the landscape image orientation, the image of the document is defined to be in the landscape image orientation.

The central premise of these steps is that the user's facial orientation will be used to determine whether the image capture device capturing the image of the document is in the portrait image orientation or the landscape image orientation. Advantageously, this determination can be done silently and passively, without the user's knowledge and while the user is using the rear-side image capture device for scanning purposes.

Accordingly, a method in an electronic device can comprise receiving user input at a user interface of the electronic device requesting a scanning operation be performed by an image capture device of the electronic device and initiating the scanning operation using the image capture device to scan an object situated within a field of view of the image capture device. The method can then comprise detecting, with one or more sensors, a triggering event and capturing, with another image capture device of the electronic device in response to detecting the triggering event, an image of a source of the user input. One or more processors can then determine whether the image of the source is in a portrait orientation or a landscape orientation. Once so determined, the one or more processors can cause the scan of the object to have an image orientation that is the same as that of the image of the source.

Figure 1B:
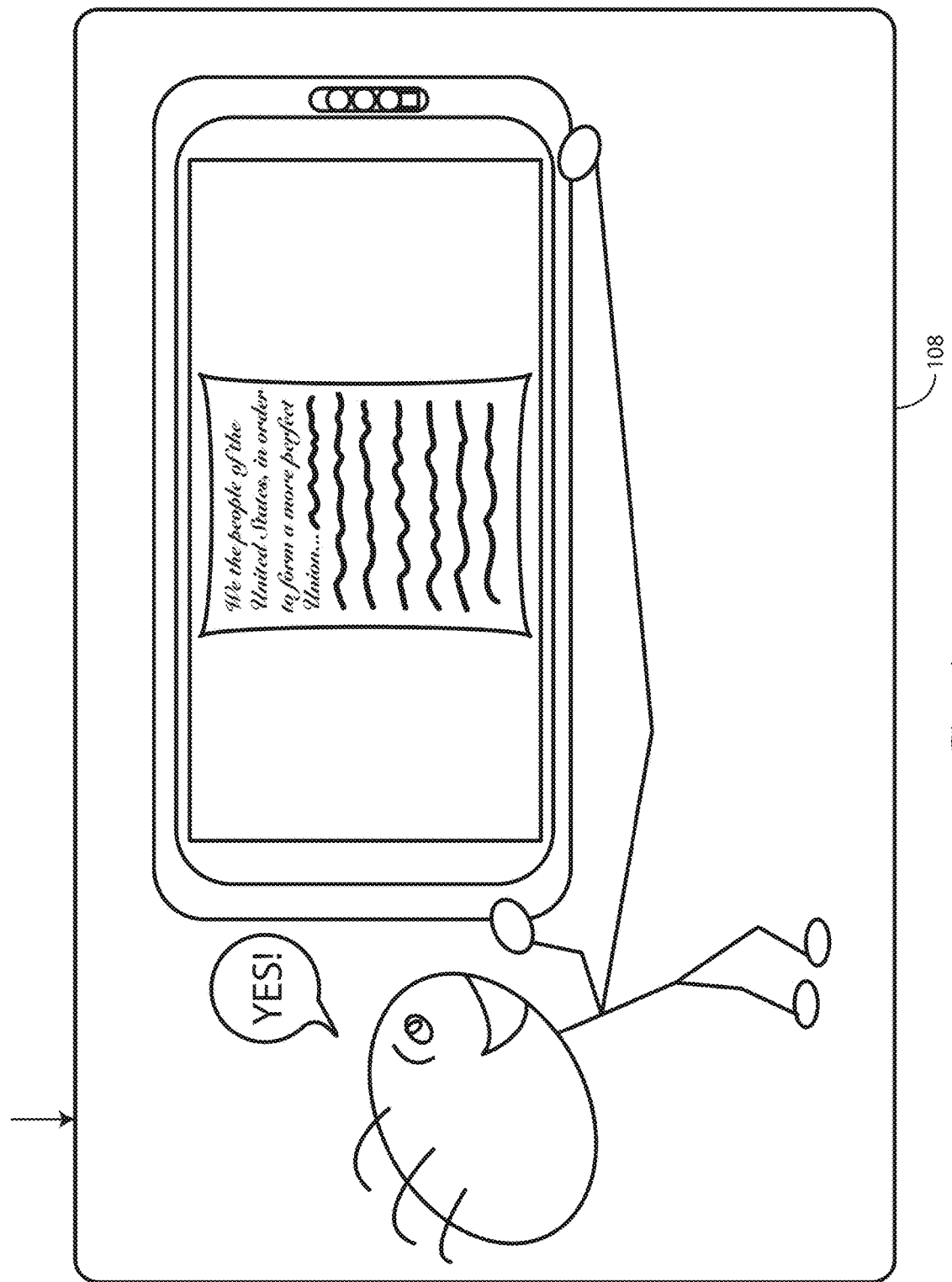
FIG. 1B illustrates one or more explanatory method steps in accordance with one or more embodiments of the disclosure.

Turning now to FIGS. 1A and 1B, illustrated therein is one such method 100. Beginning at step 101, a scanning or imaging operation is initiated. In one or more embodiments, this step 101 comprises an electronic device 110 receiving user input at a user interface of the electronic device 110 requesting that a scanning operation be performed by an image capture device of the electronic device 110.

This is the case in this example. As shown at step 102, a user 109 of the electronic device 110 is using the electronic device 110 to scan a document 112 that has been placed on a horizontal surface 113, which in this illustrative example is a table. At step 102, one or more processors of the electronic device 110 initiate the scanning operation requested at step 101 by using an image capture device of the electronic device 110 to scan an object (here the document 112) situated within a field of view 111 of the image capture device.

In this illustrative example, step 102 also includes the one or more processors also detect a triggering event. As shown, the user 109 is holding the electronic device 110 substantially horizontally in three-dimensional space 1110. This "horizontal positioning" constitutes a triggering event in that the orientation detector or other sensors of the electronic device 110 may not be able to resolve the orientation of the electronic device 110, or more particularly the image capture device being used to scan the document 112, relative to that document 112. Accordingly, the one or more processors capture, using another image capture device of the electronic device 110 in response to detecting the triggering event, another image of the user 109 who is the source of the user input received at step 101 that initiated the scanning operation.

These images are shown at step 103. As shown, a first image capture device of the electronic device 110 is capturing an image 114 of the document 112, which sits within the field of view 111 of the first image capture device. Additionally, a second image capture device 116 is capturing another image 115 of the user 109, who is situated within another field of view 117 of the second image capture device 116. In one or more embodiments, the first image capture device captures the image 114 of the document 112 concurrently with the second image capture device 116 capturing the image 115 of the user 109. In one or more embodiments, the second image capture device 116 capturing the image 115 of the user 109 during the capture of the image 114 of the document by the first image capture device.

At step 104, the one or more processors of the electronic device 110 determine whether the image 115 of the source of the user input received at step 101 (here, the user 109) is in a portrait image orientation or a landscape image orientation. At step 105, the one or more processors compare the image orientation of the image 115 of the user 109 to the image orientation of the image 114 of the document 112. At step 106, the one or more processors cause the image 114 of the document 112 to have the same image orientation as that of the image 115 of the user 109.

Step 107 illustrates how this can occur. In one or more embodiments, the one or more processors of the electronic device 110 determine the image orientation associated with the image 115 of the user by determining an orientation of a depiction 118 of a head 119 of the user relative to an aspect ratio 120 of the image 115 of the user 109. If, for example, the aspect ratio 120 is 9:16, and the orientation 121 of the depiction 118 of the head 119 is vertical, i.e., along the "16" of the 9:16 aspect ratio, then the image 115 depicting 118 the head 119 of the user 109 is defined to be a portrait image orientation. By contrast, if the aspect ratio 120 is 16:9, and the orientation 121 of the depiction 118 of the head 119 is vertical, i.e., along the "9" of the 16:9 aspect ratio, then the image 115 depicting 118 the head 119 of the user 109 is defined to be a landscape image orientation. Similarly, if the aspect ratio 120 is 3:4, and the orientation 121 of the depiction 118 of the head 119 is vertical, i.e., along the "4" of the 3:4 aspect ratio, then the image 115 depicting 118 the head 119 of the user 109 is defined to be a portrait image orientation. By contrast, if the aspect ratio 120 is 4:3, and the orientation 121 of the depiction 118 of the head 119 is vertical, i.e., along the "3" of the 14:3 aspect ratio, then the image 115 depicting 118 the head 119 of the user 109 is defined to be a landscape image orientation, and so forth.

In other embodiments, the determination of whether the image 115 depicting 118 the user 109 is in the portrait image orientation or the landscape image orientation comprises determining an orientation of a depiction 122 of a facial feature 123 of the user 109 relative to the aspect ratio 120 of the image 115. In this illustration, the facial feature 123 comprises the smile of the user. However, other facial features could be substituted for the smile, examples of which include the eyes, eyebrows, ears, nose, hairline, scalp, neck, or hair. Other examples of facial features suitable for determining whether the image 115 depicting 118 the user 109 is in the portrait image orientation or the landscape image orientation will be obvious to those of ordinary skill in the art having the benefit of this disclosure.

If, for example, the aspect ratio 120 is 9:16, and the orientation of the depiction 122 of the facial feature 123 is horizontal, i.e., along the "9" of the 9:16 aspect ratio, then the image 115 depicting 122 the facial feature 123 of the user 109 is defined to be a portrait image orientation. By contrast, if the aspect ratio 120 is 16:9, and the orientation of the depiction 122 of the facial feature 123 is horizontal, i.e., along the "16" of the 16:9 aspect ratio, then the image 115 depicting 122 the facial feature 123 of the user 109 is defined to be a landscape image orientation, and so forth.

Once the image orientation of the image 115 of the user 109 is determined, it can be compared with the image orientation of the image 114 that includes a depiction 124 of the document 112. In this illustrative example, the first image capture device of the electronic device 110 initially captured the image 114 of the document 112 in a portrait image orientation 126. This is simply determined by detecting the aspect ratio 125 of the image 114. Since step 106 comprises defining the image orientation associated with the image 114 of the document 112 to be the same as the image orientation associated with the image 115 of the user 109, step 107 comprises rotating the portrait image orientation boundary such that it transforms to the landscape image orientation 127. Accordingly, when the user 109 looks at the image 114 of the document 112 at step 108, the image 114 is exactly as it was through the viewfinder at step 102. This is true despite the fact that the orientation detector or other sensors of the electronic device 110 were unable to resolve the orientation of the electronic device 110 in the three-dimensional space 1110 relative to the orientation of the document 112 on the horizontal surface 113.

Figure 2:
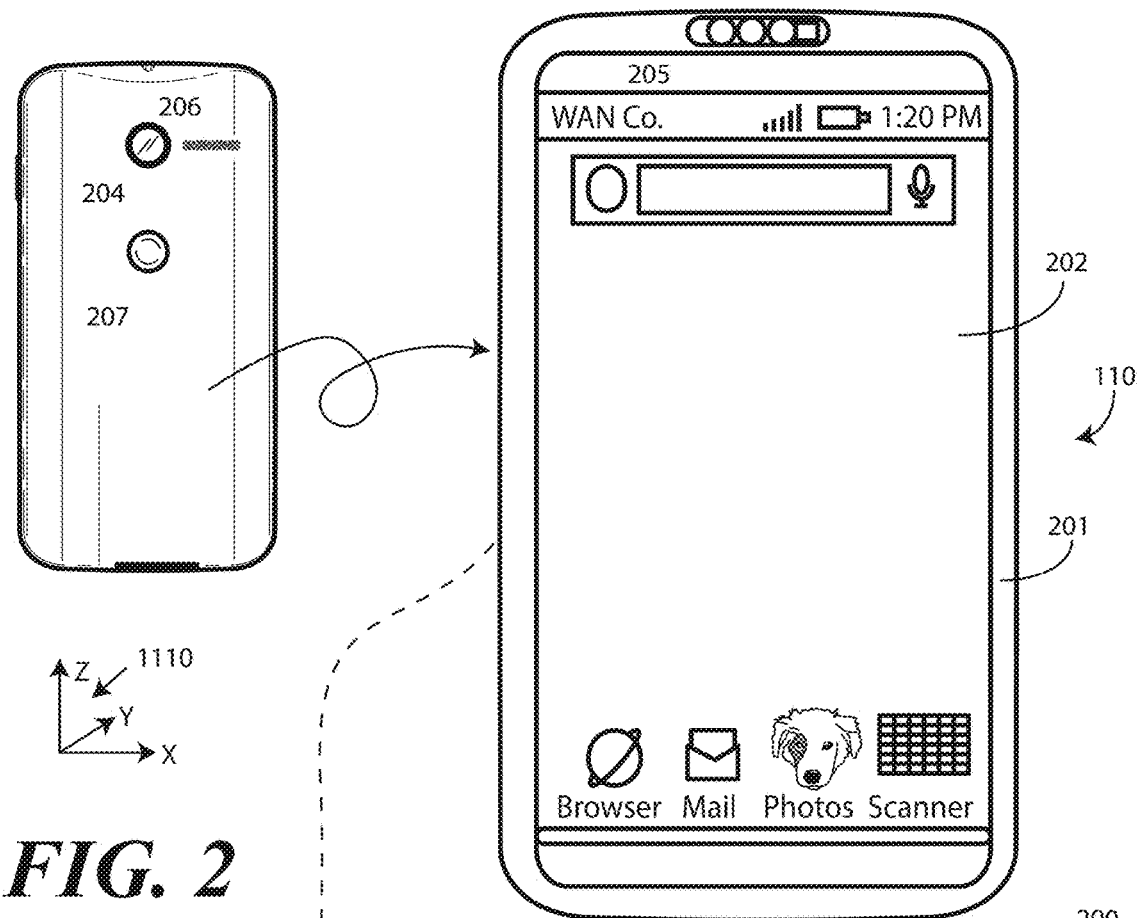
FIG. 2 illustrates one explanatory electronic device in accordance with one or more embodiments of the disclosure.
Figure 2:
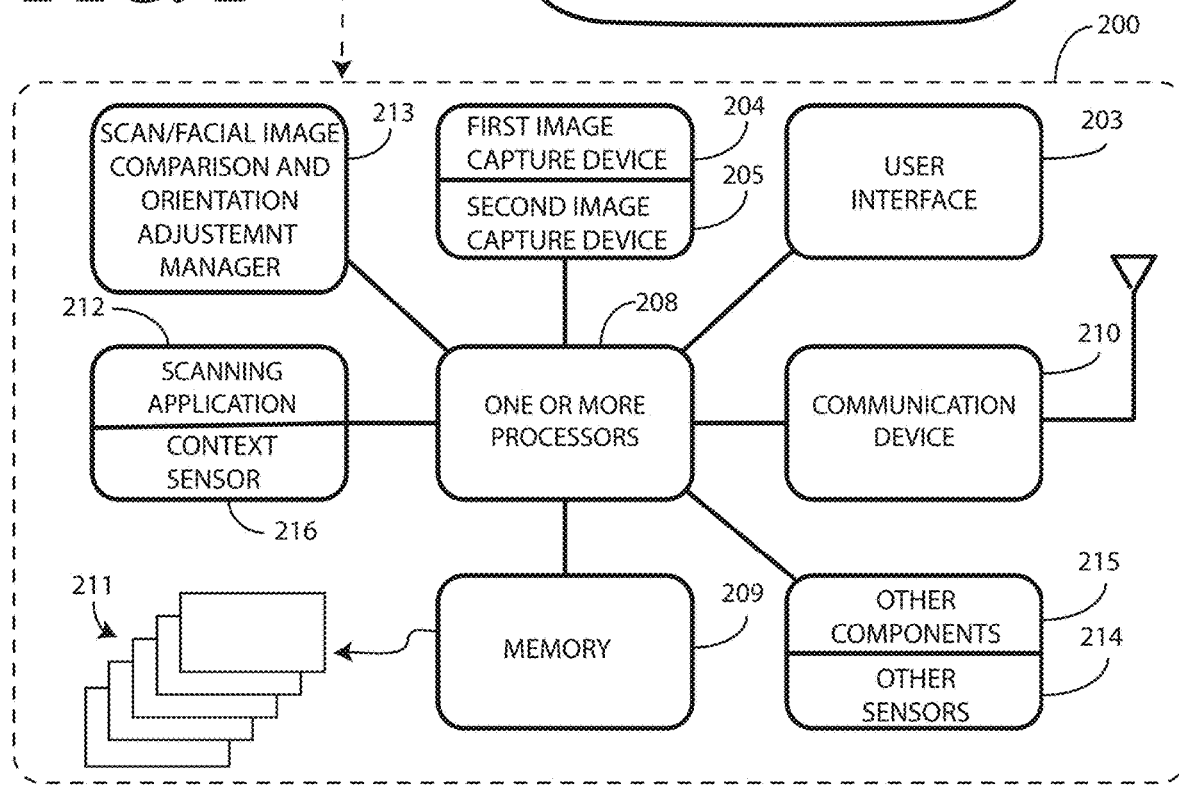

Turning now to FIG. 2, illustrated therein is one explanatory electronic device 110 configured in accordance with one or more embodiments of the disclosure. While illustrated as including a singular device housing 201 configured in a traditional "candy bar" form factor, the electronic device 110 could also be a hinged electronic device as well. Where configured as a candy bar, the display 202 of electronic device 110 remains exposed and accessible. By contrast, where configured as a hinged device having a first device housing that is selectively pivotable about a hinge relative to the second device housing between a closed position and an axially displaced open position, the display 202 of the electronic device 110 can be selectively concealed and revealed, depending upon whether the electronic device 110 is in the closed position or the axially displaced open position. The electronic device 110 could take other forms as well, including being configured as a slider device with two device housings that slide relative to each other, as a pivoter with two device housings that pivot relative to each other, or in other configurations.

The electronic device 110 of FIG. 2 is configured as a portable electronic device, and for illustrative purposes is configured as a smartphone. However, the electronic device 110 could be configured in other ways as well. For example, the electronic device 110 could be configured as a tablet computer, a gaming device, a multimedia player, and so forth. Still other types of electronic devices can be configured in accordance with one or more embodiments of the disclosure as will be readily appreciated by those of ordinary skill in the art having the benefit of this disclosure.

This illustrative electronic device 110 includes a display 202, which may optionally be touch-sensitive. In one embodiment where the display 202 is touch-sensitive, the display 202 can serve as a primary user interface 203 of the electronic device 110. Users can deliver user input to the display 202 of such an embodiment by delivering touch input from a finger, stylus, or other objects disposed proximately with the display 202.

In one embodiment, the display 202 is configured as an active matrix organic light emitting diode (AMOLED) display. However, it should be noted that other types of displays, including liquid crystal displays, would be obvious to those of ordinary skill in the art having the benefit of this disclosure. Where the electronic device 110 is configured with a keyboard and/or mouse, such as when the electronic device 110 is configured as a computer, the keyboard and/or mouse can serve as the primary user interface 203.

A device housing 201 is positioned about the display 202. In one or more embodiments the device housing 201 is manufactured from a rigid material such as a rigid thermoplastic, metal, or composite material, although other materials can be used. In other embodiments, the electronic device 110 will be bendable, but will not include a hinge. Illustrating by example, the device housing 201 can be manufactured from a bendable material. In still other embodiments, the electronic device 110 can be bendable via a combination of hinge components and non-hinge components.

Illustrating by example, in another embodiment the electronic device 110 of FIG. 1 includes a device housing that housing is flexible. In one embodiment, the device housing may be manufactured from a malleable, bendable, or physically deformable material such as a flexible thermoplastic, flexible composite material, flexible fiber material, flexible metal, organic or inorganic textile or polymer material, or other materials. The device housing could be formed from a single flexible housing member or from multiple flexible housing members.

In other embodiments, the device housing could be a composite of multiple components. For instance, in another embodiment the device housing could be a combination of rigid segments connected by hinges or flexible materials. Still other constructs will be obvious to those of ordinary skill in the art having the benefit of this disclosure.

Features can be incorporated into the device housing 201, either on the front side of the device housing 201 defining a first major surface with the display 202 or on the rear side of the device housing 201 defining a second major surface of the electronic device 110. Examples of such features include image capture device 204, which in this embodiment is a rear surface or outwardly facing imager. The image capture device 204, which can be any number of types of image capture devices, has its lens situated such that it is directed away from a user who is holding the electronic device 110 and facing the display 202. This allows the image capture device 204 to receive light directed toward the electronic device 110 from a location in front of the user when the user is holding the electronic device 110 and facing the first display 202.

Instead of, or alternatively in addition to, the image capture device 204, a second, front surface or inwardly facing image capture device 205 can be positioned on the interior side of the electronic device 110 to receive light and images directed toward the display 202. When a user is holding the electronic device 110 and looking at the display 202, this second, inward facing image capture device 205 can be used to take a "selfie" without turning the electronic device 110 around. While two imagers are shown in the illustrative embodiment of FIG. 1, it should be noted that embodiments of the disclosure can include additional imagers mounted in different positions that can be actuated to capture images from different angles.

Other examples of features that can be incorporated into the device housing 201 include an optional speaker port 206. While shown situated on a first major surface of the electronic device 110 defined by the rear side of the device housing 201 in FIG. 1, the optional speaker port 206 could also be placed on the second major surface defined by the display 202 and surrounding device housing 201 as well.

In this illustrative embodiment, a user interface component 207, which may be a button or touch sensitive surface, can also be disposed along the rear side of the device housing 201. As noted, any of these features could be located elsewhere, such as on the interior side or minor sides in other embodiments.

A block diagram schematic 200 of the electronic device 110 is also shown in FIG. 2. The block diagram schematic 200 can be configured as a printed circuit board assembly disposed within the device housing 201 of the electronic device 110. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

In one or more embodiments, the electronic device 110 includes one or more processors 208. In one embodiment, the one or more processors 208 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 110. Each of the application processor and the auxiliary processor(s) can be configured to process and execute executable software code to perform the various functions of the electronic device 110. A storage device, such as memory 209, can optionally store the executable software code used by the one or more processors 208 during operation.

The electronic device 110 also includes a communication device 210 that can be configured for wired or wireless communication with one or more other devices or networks. The networks can include a wide area network, a local area network, and/or personal area network. The communication device 210 may also utilize wireless technology for communication, such as, but are not limited to, peer-to-peer or ad hoc communications such as HomeRF, Bluetooth and IEEE 802.11, and other forms of wireless communication such as infrared technology. The communication device 210 can include wireless communication circuitry, one of a receiver, a transmitter, or transceiver, and one or more antennas.

In one embodiment, the one or more processors 208 can be responsible for performing the primary functions of the electronic device 110. For example, in one embodiment the one or more processors 208 comprise one or more circuits operable with one or more user interface devices, which can include the display 202, to receive user input requesting a scanning operation be performed by an image capture device 204 of the electronic device 110. The executable software code used by the one or more processors 208 can be configured as one or more modules 211 that are operable with the one or more processors 208. Such modules 211 can store instructions, control algorithms, logic steps, and so forth.

In one embodiment, the one or more processors 208 are responsible for running the operating system environment of the electronic device 110. The operating system environment can include a kernel and one or more drivers, and an application service layer, and an application layer. The operating system environment can be configured as executable code operating on one or more processors or control circuits of the electronic device 110. The application layer can be responsible for executing application service modules. The application service modules may support one or more applications or "apps," which can include a scanning application 212 operable to scan documents or similar objects. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Illustrating by example, in one or more embodiments the memory 209 defines a non-volatile and non-transitory storage system that stores modules 211 and/or executable code for a scan and/or facial or torso image comparison and orientation adjustment manager 213. In one or more embodiments, the scan and/or facial or torso image comparison and orientation adjustment manager 213 can determine, in conjunction with the one or more processors 208, an image orientation associated with an image of a user captured by one image capture device 205. The scan and/or facial or torso image comparison and orientation adjustment manager 213 can also define, again in conjunction with the one or more processors 208, another image orientation associated with an image of an object scanned by the scanning application 212 using the other image capture device 204.

Illustrating by example, in one or more embodiments in response to user input received at the user interface 203 requesting that the scanning application 212 employ the rear image capture device 204 capture an image or scan of an object such as a document, the scan and/or facial or torso image comparison and orientation adjustment manager 213 can cause the other image capture device 205 to capture an image of the user delivering the user input to the user interface 203. The scan and/or facial or torso image comparison and orientation adjustment manager 213 can then define an image orientation of the image of the object to be the same as another image orientation of the image of the user as previously described above with reference to the method steps of FIG. 1.

The memory 209 may be operatively coupled to the one or more processors 208 via internal communications buses. Alternatively, the memory 209 may be integrated with the one or more processors 208 or may be some combination of operatively coupled memory and integrated memory.

It should be noted that while the modules 211 can be configured as one or more executable instructions stored in the memory 209, the could alternatively be configured as distributed systems or components of a distributed system having a server, such as an enterprise server, running the scanning application 212 or other components, elements, or features of the electronic device 110.

In one or more embodiments, the one or more processors 208 are operative with the code and/or modules 211 to execute one or both of the scanning application 212 and/or the scan and/or facial or torso image comparison and orientation adjustment manager 213. The scanning application 212 and/or the scan and/or facial or torso image comparison and orientation adjustment manager 213 can alternatively be implemented in a client-server operation where each is accessed by the one or more processors 208 across a network using the communication device 210.

In one embodiment, the one or more processors 208 may generate commands or execute control operations based upon user input received at the user interface 203. Moreover, the one or more processors 208 may process the received information alone or in combination with other data, such as the information stored in the memory 209.

The electronic device 110 can include one or more sensors 214. The one or more sensors 214 may include a microphone, an earpiece speaker, and/or a second loudspeaker. The one or more other sensors 214 may also include touch actuator selection sensors, proximity sensors, a touch pad sensor, a touch screen sensor, a capacitive touch sensor, and one or more switches. Touch sensors may used to indicate whether any of the user actuation targets present on the display 202. The other sensors 214 can also include audio sensors and video sensors (such as a camera).

In one or more embodiments, the one or more sensors 214 can include a geo-locator that serves as a location detector. In one embodiment, location detector captures location data from a constellation of one or more earth orbiting satellites, or from a network of terrestrial base stations to determine an approximate location of the electronic device 110. The location detector may also be able to determine location by locating or triangulating terrestrial base stations of a traditional cellular network, or from other local area networks, such as Wi-Fi networks.

The one or more sensors 214 can include an orientation detector that determines an orientation and/or movement of the electronic device 110 in three-dimensional space 1110. Illustrating by example, the orientation detector can include an accelerometer, gyroscopes, or other device to detect device orientation and/or motion of the electronic device 110. Using an accelerometer as an example, an accelerometer can be included to detect motion of the electronic device 110. Additionally, the accelerometer can be used to sense some of the gestures of the user, such as one talking with their hands, running, or walking.

The orientation detector can determine the spatial orientation of an electronic device 110 in three-dimensional space by, for example, detecting a gravitational direction (1109). In addition to, or instead of, an accelerometer, an electronic compass can be included to detect the spatial orientation of the electronic device 110 relative to the earth's magnetic field. Similarly, one or more gyroscopes can be included to detect rotational orientation of the electronic device 110.

The one or more sensors 214 can also include a face analyzer and/or an environmental analyzer. The face analyzer and/or environmental analyzer can be configured to process images captured by the first image capture device 204 or the second image capture device 204 to determine whether a person or object depicted in the captured image matches predetermined criteria by comparing the image to one or more predefined references stored in memory 209.

For example, the face analyzer and/or environmental analyzer can operate as an authentication or orientation determination module configured with optical and/or spatial recognition to identify objects using image recognition, character recognition, visible recognition, facial recognition, color recognition, shape recognition, and the like. Advantageously, the face analyzer and/or environmental analyzer can be used as a facial recognition device to determine the orientation of heads, faces, facial features, or torso elements depicted in images captured around the electronic device 110.

The one or more sensors 214 can also include a gaze detector. The gaze detector can comprise sensors for detecting the user's gaze point. The gaze detector can optionally include sensors for detecting the alignment of a user's head in three-dimensional space. Electronic signals can then be processed for computing the direction of user's gaze in three-dimensional space. The gaze detector can further be configured to detect a gaze cone corresponding to the detected gaze direction, which is a field of view within which the user may easily see without diverting their eyes or head from the detected gaze direction. The gaze detector can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector.

The face analyzer of the one or more sensors 214 can include its own image/gaze detection-processing engine as well. The image/gaze detection-processing engine can process information to detect the orientation of a bodily component of the user. Illustrating by example, the image/gaze detection-processing engine can optionally also work with the captured images to detect an alignment of a user's head in three-dimensional space 1110.

Other components 215 operable with the one or more processors 208 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 215 can also include proximity sensors. The proximity sensors fall in to one of two camps:

active proximity sensors and "passive" proximity sensors. Either the proximity detector components or the proximity sensor components can be generally used for gesture control and other user interface protocols, some examples of which will be described in more detail below.

The other components 215 can optionally include a barometer operable to sense changes in air pressure due to elevation changes or differing pressures of the electronic device 110. The other components 215 can also optionally include a light sensor that detects changes in optical intensity, color, light, or shadow in the environment of an electronic device. This can be used to make inferences about context. An infrared sensor can be used in conjunction with, or in place of, the light sensor. The infrared sensor can be configured to detect thermal emissions from an environment about the electronic device 110. Similarly, a temperature sensor can be configured to monitor temperature about an electronic device 110.

A context engine 216 can then operable with the various sensors to detect, infer, capture, and otherwise determine persons and actions that are occurring in an environment about the electronic device 110. For example, where included one embodiment of the context engine 216 determines assessed contexts and frameworks using adjustable algorithms of context assessment employing information, data, and events. These assessments may be learned through repetitive data analysis. Alternatively, a user may employ the user interface 203 to enter various parameters, constructs, rules, and/or paradigms that instruct or otherwise guide the context engine 216 in detecting orientations of objects within an environment of the electronic device 110. The context engine 216 can comprise an artificial neural network or other similar technology in one or more embodiments.

In one or more embodiments, the context engine 216 is operable with the one or more processors 208. In some embodiments, the one or more processors 208 can control the context engine 216. In other embodiments, the context engine 216 can operate independently, delivering information gleaned from the environment of the electronic device 110 and other contextual information to the one or more processors 208. The context engine 216 can receive data from the various sensors. In one or more embodiments, the one or more processors 208 are configured to perform the operations of the context engine 216.

It is to be understood that FIG. 2 is provided for illustrative purposes only and for illustrating components of one electronic device 110 in accordance with embodiments of the disclosure and is not intended to be a complete schematic diagram of the various components required for an electronic device. Therefore, other electronic devices operable to implement agenda/calendaring event notification mismatch operations in accordance with embodiments of the disclosure may include various other components not shown in FIG. 2 or may include a combination of two or more components or a division of a particular component into two or more separate components, and still be within the scope of the present disclosure.

Figure 3:
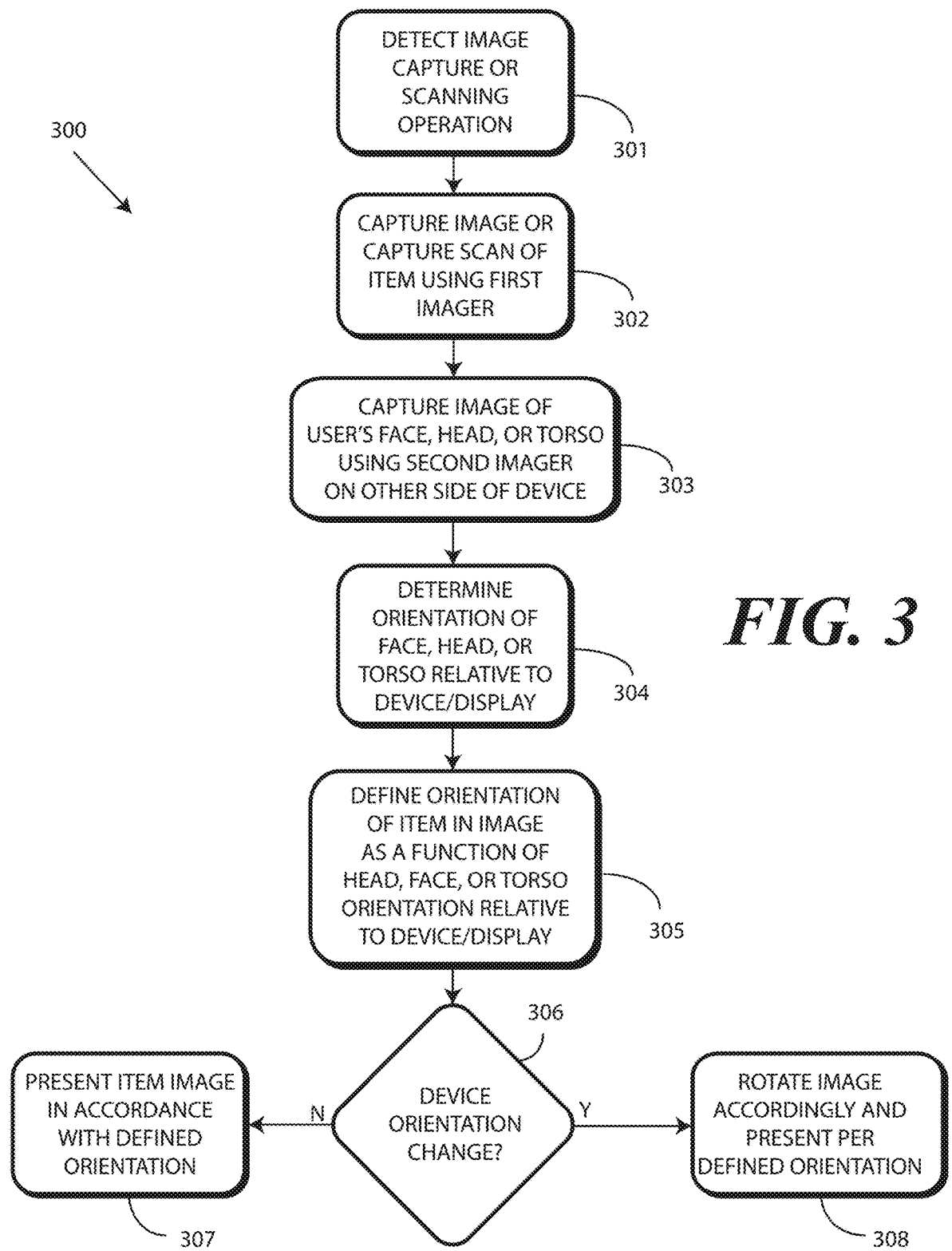
FIG. 3 illustrates one explanatory method in accordance with one or more embodiments of the disclosure.

Turning now to FIG. 3, illustrated therein is one explanatory method 300 suitable for operation with an electronic device (110) such as that illustrated and described above with reference to FIG. 2. Beginning at step 301, the method 300 detects the initiation of an image capture operation. In one or more embodiments, the image capture operation initiated at step 301 is that of a scanning operation where a document or similar object is to be scanned using an image capture device of an electronic device. Illustrating by example, a user may deliver user input to a user interface of the electronic device to launch a scanning application, actuate an image capture device, actuate a view-finder, perform other actions, or combinations thereof to initiate a scanning operation to scan a document or similar object. In response, the method commences the scanning operation at step 301 in one or more embodiments.

At step 302, the method 300 captures, with a first image capture device situated on a first major surface of an electronic device, an image of the object. At step 303, the method 300 also captures, with a second image capture device situated on a second major surface of the electronic device, another image of a user of the electronic device. In one or more embodiments, the user is the user who initiated the scanning operation at step 301. In one or more embodiments, the second major surface is situated on an opposite side of the electronic device relative to the first major surface. Illustrating by example, if the first major surface is the back surface of the electronic device, one example of which is shown in FIG. 1, the second major surface might be the front surface of the electronic device, which is shown as the opposite major surface of the electronic device in FIG. 1.

In one or more embodiments, the other image captured at step 303 captures a head, face, characteristic feature, or torso portion of the user. Illustrating by example, the other image captured at step 303 may include depictions of the user's head and/or neck such that the orientation of the head and/or neck can be determined relative to the sensor orientation of the second image capture device that defines whether the other image captured at step 303 is captured in a portrait mode or a landscape mode. In other embodiments, depictions of the user's eyes, hairline, smile, ears, nose, cheeks, forehead, facial hair, shoulders, or other torso portions are captured at step 303 to determine their orientation relative to the sensor orientation of the second image capture device that defines whether the other image captured at step 303 is captured in a portrait mode or a landscape mode, and so forth.

At step 304, the method 300 determines an image orientation associated with the image of the user captured at step 303 using the head, face, characteristic feature, or torso portion of the user and its relative orientation to the sensor orientation of the second image capture device that defines whether the other image captured at step 303 is captured in a portrait mode or a landscape mode. In some embodiments, the image orientation associated with the other image of the user determined at step 304 will be a portrait image orientation. In other embodiments, the image orientation associated with the other image of the user determined at step 304 will be a landscape image orientation.

In one or more embodiments, the determination of step 304 is made by comparing a defining characteristic of the user to determine whether it is closer to a vertical or horizontal reference of the portrait mode or the landscape mode. Illustrating by example, if the characteristic of the depiction of the user used to determine orientation is a vertically running characteristic, examples of which include the nose, the medial vertical axis of the face, or the neck, step 304 determines whether an axis defined by this vertically running characteristic is closer to the major dimension of the portrait mode or the minor dimension of the landscape mode. If the vertically running characteristic is not perfectly vertical but is only fifteen degrees away from the major dimension of the portrait mode and seventy-five degrees from the minor axis of the landscape mode, step 304 will determine that the other image captured at step 303 is in the portrait mode.

Similarly, if the characteristic of the depiction of the user used to determine orientation is a horizontally running characteristic, examples of which include a line running ear to ear, eye to eye, the eyebrows, the smile, the hairline, the top of the head, the chin, or the medial horizontal axis of the face, step 304 determines whether an axis defined by this horizontally running characteristic is closer to the minor dimension of the portrait mode or the major dimension of the landscape mode. If the horizontally running characteristic is not perfectly horizontal, but is only twenty degrees away from the minor dimension of the portrait mode and seventy degrees from the major axis of the landscape mode, step 304 will determine that the other image captured at step 303 is in the landscape mode.

Advantageously, this comparison being performed at step 304 allows for a variety of user positions to appear as depictions in the other image captured at step 303 while still accurately identifying the orientation of the user relative to the sensor orientation of the second image capture device that defines whether the other image captured at step 303 is captured in a portrait mode or a landscape mode. An illustration of how this occurs appears in FIG. 9.

Figure 9:
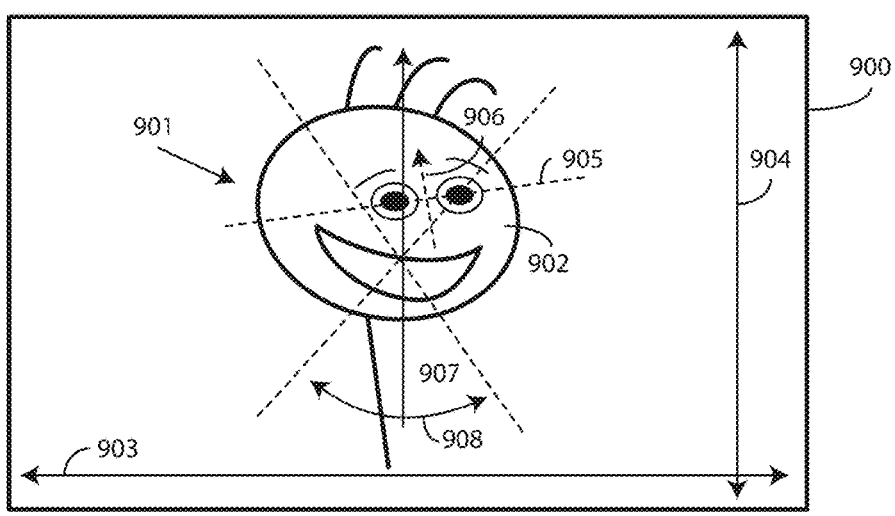
FIG. 9 illustrates one or more explanatory image analysis steps in accordance with one or more embodiments of the disclosure.

Turning briefly to FIG. 9, illustrated therein is one explanatory example of an image 900 that can be captured at step (303) of the method (300) of FIG. 3. As shown, there is a depiction 901 of a user 902 of an electronic device who requested that a scanning operation commence. It just so happens that in this image 900 the user 902 happens to be situated somewhat askew from the major dimension 903 and the minor dimension 904 of the image 900, which happens to define a landscape orientation in this example.

Illustrative defining characteristics that can be used to determine the orientation of the depiction 901 of the user 902 include a line 905 running from eye to eye or a medial line 906 along the nose. As shown in this illustration, here neither is either orthogonal or parallel, respectively, to a perfectly vertical axis 907. However, step (304) of the method (300) of FIG. 3 can still accurately determine the orientation of the depiction 901 of the user 902 due to the fact that the medial line 906 of the nose is within a predefined range 908 leaving it closer to the minor dimension 904 of the image 900 than the major dimension 903 of the image 900 (the opposite determination can be made for the line 905 running from eye to eye). Accordingly, step (304) of the method (300) of FIG. 3 would determine that the orientation of the depiction 901 of the user 902 would be in the landscape mode in FIG. 9.

Figure 4:
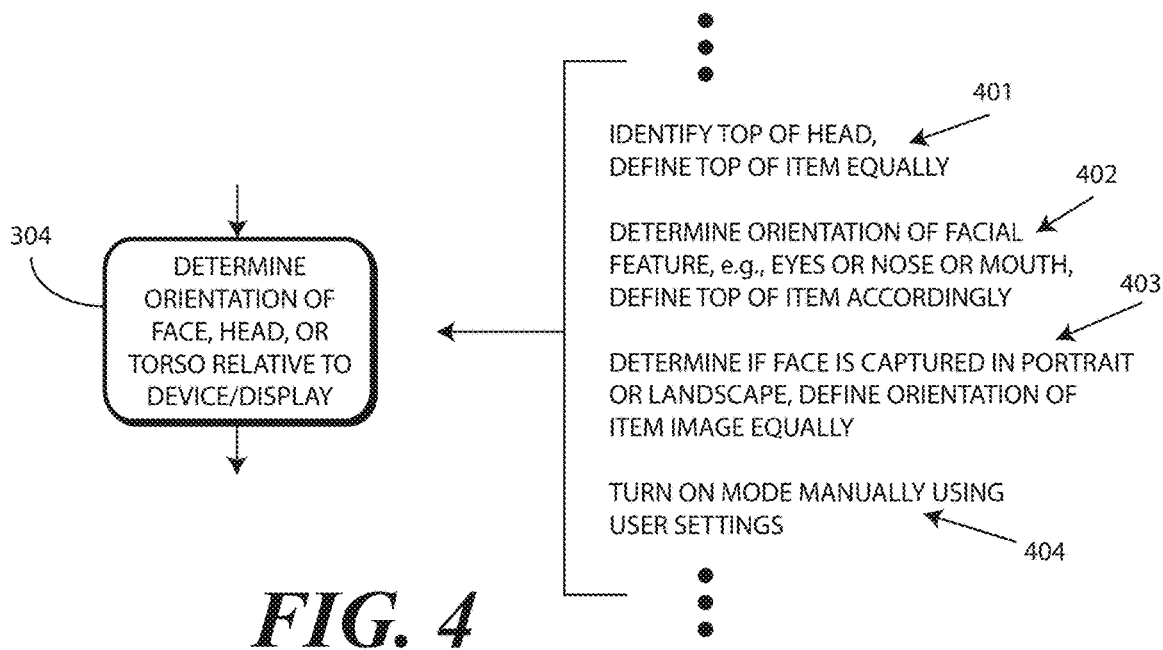
FIG. 4 illustrates explanatory options for determining an orientation of a user of an electronic device relative to an image orientation in accordance with one or more embodiments of the disclosure.

Turning briefly to FIG. 4, illustrated therein are a few explanatory ways of determining the orientation of the depiction (901) of the user (902) in the image (900) captured at step (303) of the method (300) of FIG. 3. Others have been described above. Still others will be obvious to those of ordinary skill in the art having the benefit of this disclosure.

In one or more embodiments, step 304 of FIG. 3 comprises identifying the top of a head 401 of the depiction (901) of the user (902) and comparing a line tangent to the top of the head with the major or minor dimensions of the image itself. Step 304 then compares this head top line to a vertical or horizontal reference of the portrait mode or the landscape mode. If the head top line is closer to the minor dimension of the portrait mode or the major dimension of the landscape mode, this means that the orientation is portrait mode or landscape mode, respectively.

As noted above, another way to determine the orientation of the depiction (901) of the user (902) at step 304 is to use a facial feature 402. Examples of such facial features 402 include a line running ear to ear, eye to eye, the eyebrows, the smile, the hairline, the top of the head, the chin, the medial horizontal axis of the face, or other horizontally running facial features 402. These facial features 402 can also include vertically running characteristics, examples of which include the nose, the medial vertical axis of the face, or the neck.

In one or more embodiments, using facial recognition technology or other similar techniques, step 304 can determine an orientation of the user's face or torso 403 relative to the orientation of the electronic device (defined by the orientation of the sensor of the first image capture device as it is fixedly positioned along the device housing) by comparing the facial features 402 to major and minor dimensions of the image. If the image of the user's face or torso 403 is determined at step 304 to be the portrait image orientation, the image of the document is defined to be in the portrait image orientation. If the image of the user's face or torso 403 is determined at step 304 to be the landscape image orientation, the image of the document is defined to be in the landscape image orientation.

In other embodiments, whether to perform the orientation determination at step 304 of the method (300) of FIG. 3 is simply an operating mode of the electronic device that can simply be turned ON or OFF by a user using one or more user settings 404. By allowing the a user to toggle one or more user settings 404 to either always—or never—perform the orientation determination of step 304 so that the definition of step (305) can occur allows for interesting effects, including the counterintuitive situation where text is presented on an object running from a top to a bottom of the image of an object that is shown and described below with reference to FIGS. 6A-6B. Moreover, the one or more user settings 404, when ON, assure that documents with little or no text, including hand drawings or other documents devoid of text, will always be properly aligned with relative to the user's head with the electronic device acting as arbiter to ensure that the image captured at step (302) of the method (300) of FIG. 3 and the other image captured at step (303) of the method (300) of FIG. 3 will be similarly aligned.

Turing now back to FIG. 3, at step 305 the method defines another image orientation associated with the image of the object captured at step 302 to be the same as the image orientation determined at step 304. Thus, if the image orientation associated with the other image of the user was determined at step 304 to be a portrait image orientation, the defining occurring at step 305 would comprise defining the other image orientation associated with the image of the object captured at step 302 to be the portrait image orientation. Conversely, if the image orientation associated with the other image of the user was determined at step 304 to be a landscape image orientation, the defining occurring at step 305 would comprise defining the other image orientation associated with the image of the object captured at step 302 to be the landscape image orientation.

One result of this relates to text. If, for example, the image orientation associated with the other image of the user was determined at step 304 to be a landscape image orientation, and the defining occurring at step 305 of the object captured at step 302 to be the landscape image orientation resulted in the text being present on the object running from a top to a bottom of the image captured at step 302, when that image is presented on the display or user interface of an electronic device the text would run from the bottom edge of the electronic device to the top edge of the electronic device. It would not be manipulated to diverge from the orientation associated with the other image of the user was determined at step 304 simply to make legible. Thus, if a user deliberately wanted to make the text run top to bottom rather than side to side, perhaps to get a better view of the parchment or substrate of a particular document in landscape mode, the person could use this feature to accomplish this "sideways" presentation of the document quickly and seamlessly without having to navigate a large number of user settings. One example of this will be described below with reference to FIGS. 6A-6B.

While the underlying assumption behind the method 300 of FIG. 3 is that the user will align his or her face to be the same orientation as that of the document to be scanned, which yields a result such as that shown above in FIG. 1B, the counterintuitive result described above and illustrated below in FIG. 6B highlights a principal advantage offered by the method 300 of FIG. 3. This advantage is that the method 300 of FIG. 3 neither requires, nor relies upon, text detection to determine an orientation of a document being scanned. Text detection is far more computationally intensive than is determining the image orientation of an image of a user's head or torso at step 304. Accordingly, the method 300 of FIG. 3 is far more efficient and quicker than are text-based detection systems. Moreover, there is no need to program an electronic device executing the operational steps shown in the method of FIG. 3 with the knowledge of multiple languages that are necessary for text detection either.

Advantageously, embodiments of the disclosure also work well to properly orient documents that include little or no text. If, for example, the scanning operation initiated at step 301 was that of scanning a hand drawing devoid of text, the method 300 of FIG. 3 would properly orient the hand drawing while text-based scanning systems would likely fail to do so when the orientation detectors were unable to determine an orientation of the electronic device relative to the hand drawing.

At decision 306, the method 300 determines whether the orientation of the electronic device has changed since the image of the object was captured at step 302. If it was, the image is rotated in accordance with the rotation of the electronic device at step 308. Otherwise, it is presented as captured at step 307.

Figure 5:
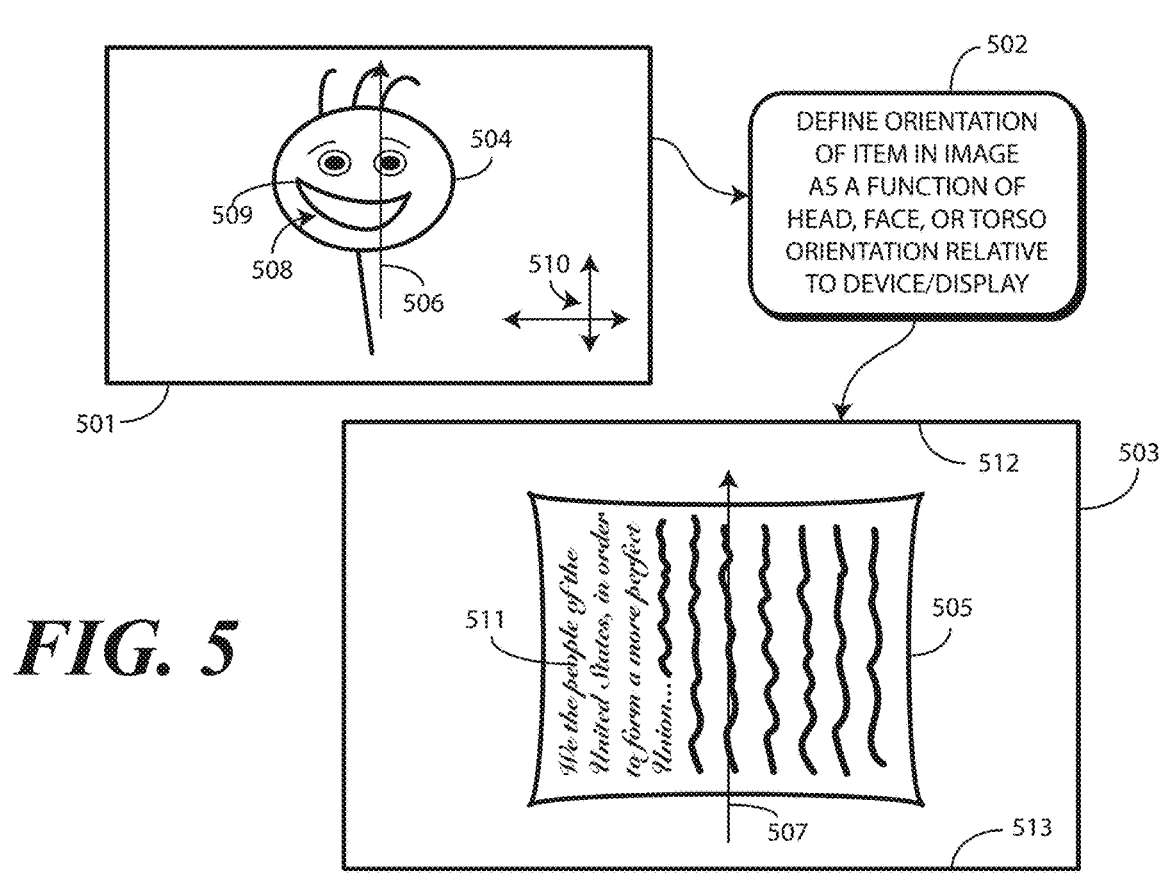
FIG. 5 illustrates one or more explanatory method steps in accordance with embodiments of the disclosure.

Turning now to FIG. 5, a simplified diagram of the method (300) of FIG. 3 is shown in operation. Initially, one or more processors of an electronic device cause, in response to user input received at a user interface at step (301) of the method (300) of FIG. 3 requesting that an image capture device capture an image 503 of an object 505, another image capture device to capture another image 501 of the user 504 delivering the user input. In this example, the capture of this other image 501 occurs while the initial image capture device captures the image 503 of the object. In one or more embodiments, the capture of this other image 501 occurs simultaneously with the initial image capture device capturing the image 503 of the object 505. In still other embodiments, the capture of this other image 501 occurs currently with the initial image capture device capturing the image 503 of the object 505.

Thereafter, the one or more processors of the electronic device determine an image orientation associated with the other image 501 of the user 504. At step 502, the one or more processors define the image orientation 507 of the image 503 of the object 505 to be the same as the image orientation 506 associated with the other image 501 of the user 504. In one or more embodiments, step 502 comprises determining an orientation 508 of a depiction of a facial feature 509 of the user 504 relative to an aspect ratio 510 of the other image 501 of the user 504. In this illustrative example, the definition of the other image orientation 507 associated with the image 503 of the object 505 to be the same as the image orientation 506 associated with the other image 501 of the user 504 results in text 511 present on the object 505 running from a top 512 to a bottom 513 of the image 503 of the object 505.

Figure 6A:
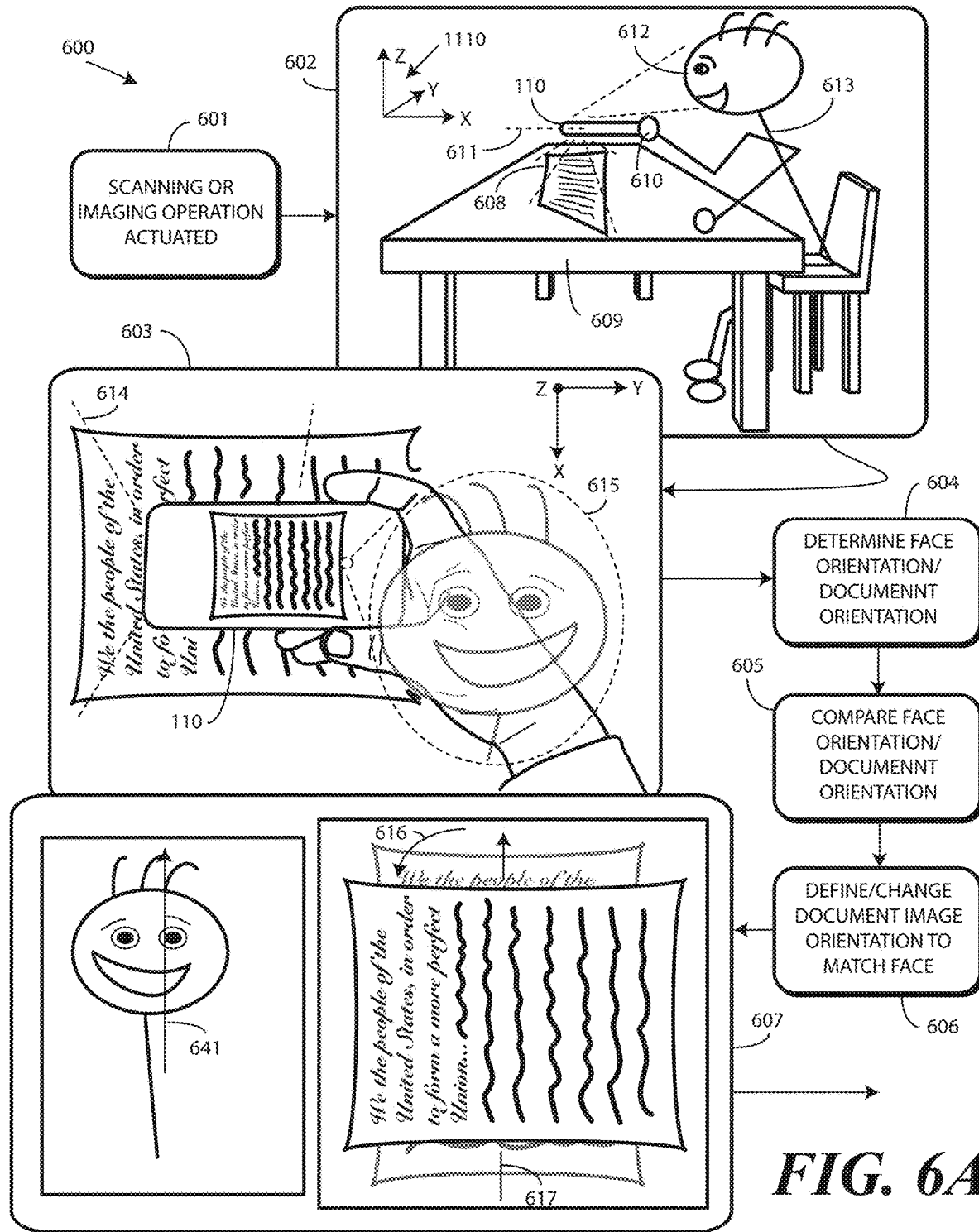
FIG. 6A illustrates one or more explanatory method steps in accordance with embodiments of the disclosure.
Figure 6B:
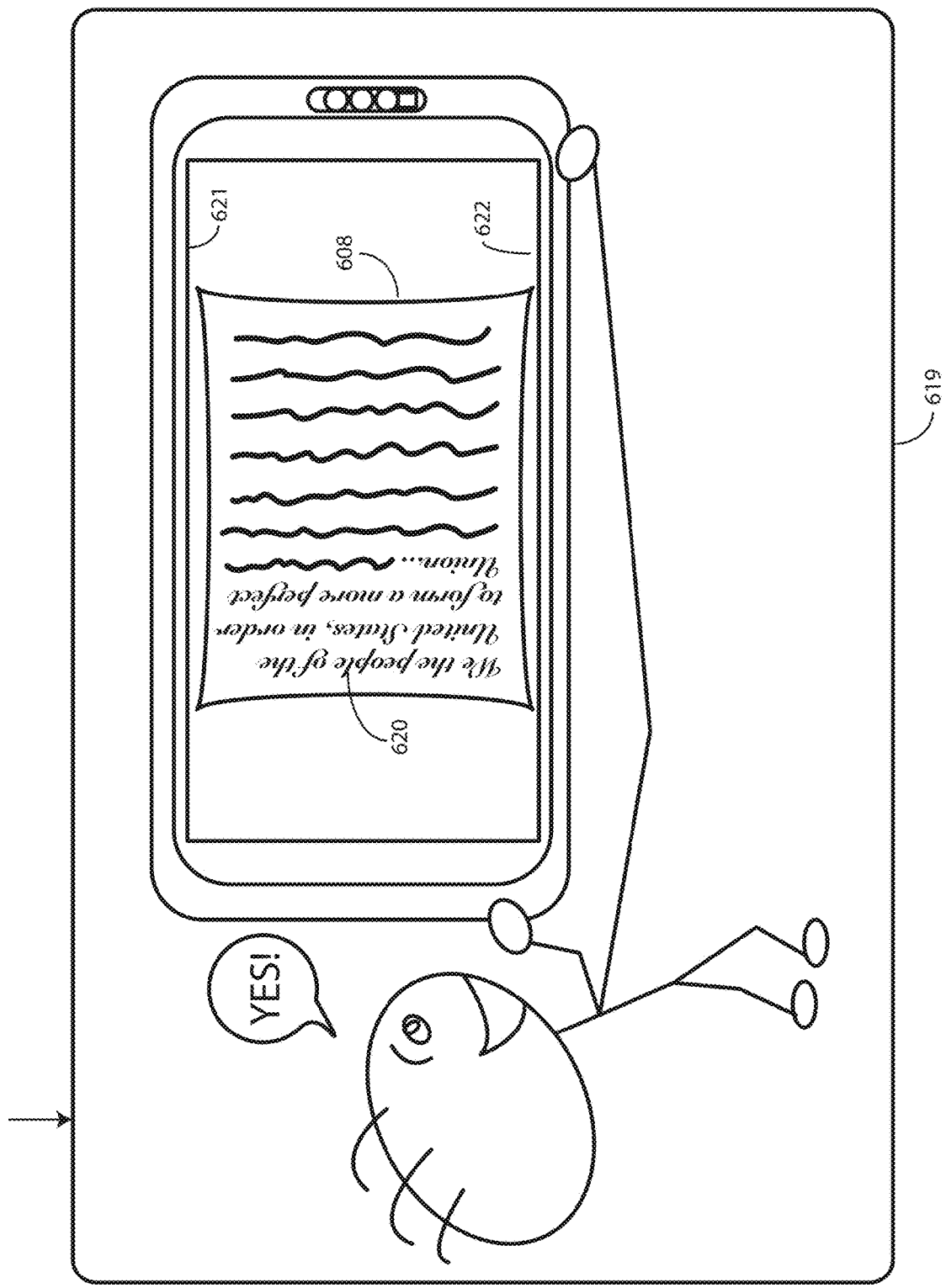
FIG. 6B illustrates one or more explanatory method steps in accordance with embodiments of the disclosure.

Turning now to FIGS. 6A-6B, illustrated therein is another explanatory method 600 in accordance with one or more embodiments of the disclosure. At step 601, one or more processors (208) of an electronic device 110 determine that a first image capture device (204) has been actuated to scan a document 608 placed on a scanning platform 609, which is situated horizontally in three-dimensional space 1110. In one or more embodiments, this step 601 occurs when user input received at the user interface (203) of the electronic device 110 requests the image capture device (204) capture an image of an object.

At step 602, the one or more processors (208) of the electronic device 110 further determine, from signals from one or more orientation detectors included with one or more sensors (214) of the electronic device 110, that the electronic device 110 is being held 610 substantially horizontally 611 or in another orientation where the orientation detector is unable to accurately ascertain whether the electronic device 110 is being held in a portrait image orientation relative to the document 608 or a landscape image orientation relative to the document 608.

At step 602, the one or more processors (208) of the electronic device 110 can optionally determine that the first image capture device (204) is situated on a major surface of the electronic device 110 defining the opposite side of the electronic device 110 from another major surface where the primary display (202) or other primary user interface (203) is situated.

At step 603, the one or more processors (208) activate another image capture device (205) of the electronic device 110 to detect the face 612 of the electronic device's user 613 using facial recognition or other similar capabilities. In one or more embodiments, the other image capture device (205) is a front-facing or "selfie" image capture device that is on the same side of the electronic device 110 as the primary display (202) or other primary user interface (203). The one or more processors (208) causing, in response to user input received at the user interface (203) requesting the image capture device (204) capture an image 614 of the document 608, the image capture device (204) to capture another image 615 of the user 613 delivering the user input at step 601.

At step 604, using facial recognition technology or other similar techniques, the one or more processors (208) determine an orientation 641 of the user's face 612 or torso relative to the orientation 611 of the electronic device 110 (defined by the orientation of the sensor of the image capture device (204) as it is fixedly positioned along the device housing (201)). At step 605, the orientation 641 of the user's face 612 or torso relative to the orientation 611 of the electronic device 110 is compared to the orientation of the image 614 of the object. At step 606, the one or more processors (208) define 616 an image orientation 617 of the image 614 of the document 608 to be the same as other image orientation 641 of the other image 615 of the user 613.

In one or more embodiments, as shown at step 607, if the image 615 of the user's face 612 or torso is determined to be the portrait image orientation, the image 614 of the document 608 is defined 616 to be in the portrait image orientation. If the image 615 of the user's face 612 or torso is determined to be the landscape image orientation, the image 614 of the document 608 is defined 616 to be in the landscape image orientation. In this illustrative example, since the document 608 was positioned sideways with its major axis aligned with the major axis of the electronic device 110 as shown at step 603, this results in text 620 present on the document 608 running from a top 621 to a bottom 622 of the image 614 of the document 608 as shown at step 619 of FIG. 6B.

It should be noted that the methods described above, which include the method (300) of FIG. 3, the method depicted in FIG. 5, the method (100) of FIGS. 1A-B, or the method (600) of FIGS. 6A-B can be configured to be selectively operable such that it is operational in some contexts and not operational in other contexts. Said differently, the second image captured of the user at, for example, step (303) of the method (300) of FIG. 3 may be captured during some scanning operations and omitted during others. This conserves power within an electronic device, extends runtime of the electronic device, and ensures that these methods only execute when necessary, such as when the orientation detector of the electronic device is unable to resolve the orientation of the electronic device relative to a document or other object being scanned.

Figure 8:
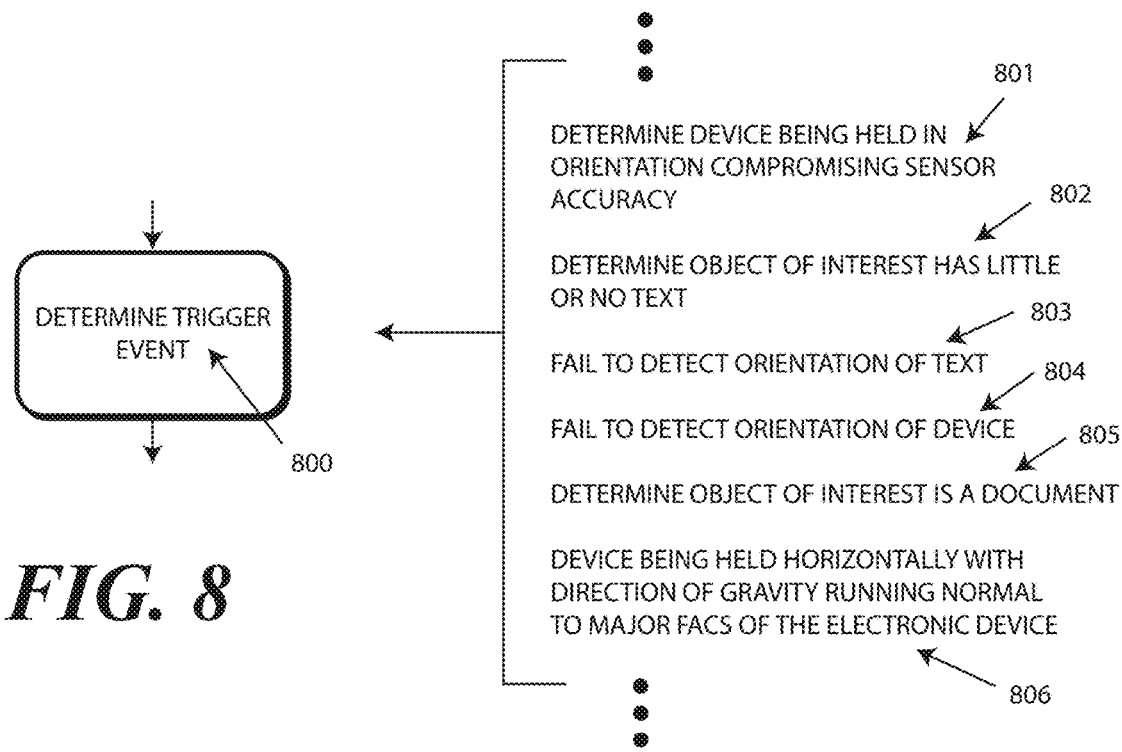
FIG. 8 illustrates one or more explanatory trigger events in accordance with one or more embodiments of the disclosure.

Turning now to FIG. 8, illustrated therein are some instances defining when these method would be operational. As noted above, a problem associated with prior art scanning applications is that they rely upon orientation detectors to determine image orientation. The one or more processors of an electronic device rely upon an accelerometer, gyroscope, other devices, or combinations thereof to determine an orientation of the electronic device in three-dimensional space.

The determination of this orientation of the electronic device in three-dimensional space is required so that the one or more processors can determine whether the scanning operation is being performed with the electronic device held sideways, i.e., in landscape mode, or held vertically, i.e., in portrait mode. If, for example, an electronic device is held in a horizontal orientation with major surfaces of the electronic device held parallel to a table or other surface that serves as the platform for scanning, these sensors are frequently unable to accurately assess the orientation of the electronic device in three-dimensional space. This is true because while the sensors can detect a horizontal orientation, they cannot determine the orientation of the device relative to the document being scanned.

Accordingly, in one or more embodiments of this disclosure the image capture of the user, along with the user orientation detection and definition of the image of the scanned object, only occur when a condition precedent referred to as a "trigger event" 800 occurs. In other instances when no trigger event is detected, these steps can be omitted. Turning now to FIG. 8, illustrated therein are examples of varying trigger events 800 that can be detected to unleash the features and advantages offered by the methods described above.

In one or more embodiments, the capture of the image of the user, the determination of the orientation of the depiction of the user in the captured image, and the definition of the image orientation of the image of the object being scanned to be the same as the image orientation of the image of the user only occurs when an orientation detector of the electronic device determines that the electronic device is being held in an orientation 801 compromising orientation detector accuracy. Illustrating by example, in one or more embodiments the capture of the image of the user, the determination of the orientation of the depiction of the user in the captured image, and the definition of the image orientation of the image of the object being scanned to be the same as the image orientation of the image of the user occurs in response to one or more sensors of the electronic device detecting the first major face being oriented 801 substantially orthogonally in three-dimensional space relative to a direction of gravity.

Another example of a trigger event 800 occurs when the object being scanned has little or no text 802. In one or more embodiments, the capture of the image of the user, the determination of the orientation of the depiction of the user in the captured image, and the definition of the image orientation of the image of the object being scanned to be the same as the image orientation of the image of the user is triggered by, and only occurs when, the object of interest being scanned includes little or no text 802. In one or more embodiments, the capture of the image of the user, the determination of the orientation of the depiction of the user in the captured image, and the definition of the image orientation of the image of the object being scanned to be the same as the image orientation of the image of the user occurs only when the object of interest being scanned is devoid of text 802.

Another example of a trigger event 800 occurs when one or more sensors of the electronic device fail 803 to detect text on the object being scanned. In one or more embodiments, the capture of the image of the user, the determination of the orientation of the depiction of the user in the captured image, and the definition of the image orientation of the image of the object being scanned to be the same as the image orientation of the image of the user occurs when one or more sensors of the electronic device fail 803 to detect text on the object of interest being scanned.

Another example of a trigger event 800 occurs when the one or more processors of the electronic device fail to resolve an orientation 804 of the electronic device in three-dimensional space. Illustrating by example, in one or more embodiments an electronic device includes a device housing defining a top edge, a bottom edge, and one or more side edges. In one or more embodiments, the one or more processors cause an image capture device to capture an image of the user when the orientation detector fails to positively detect which of the top edge, the bottom edge, or the one or more side edges is positioned at a higher elevation in three-dimensional space.

Another example of a trigger event 800 occurs when the object being scanned is determined to be a document 805. In one or more embodiments, the capture of the image of the user, the determination of the orientation of the depiction of the user in the captured image, and the definition of the image orientation of the image of the object being scanned to be the same as the image orientation of the image of the user is only occurs when, the object of interest being scanned is a document 805.

Another example of a trigger event 800 occurs when the electronic device is being held horizontally in three-dimensional space 806. In one or more embodiments the capture, of the image of the user, the determination of the orientation of the depiction of the user in the captured image, and the definition of the image orientation of the image of the object being scanned to be the same as the image orientation of the image of the user occurs in response to an orientation detector operable with the one or more processors determining that the electronic device is being held substantially horizontally in three-dimensional space. This can optionally be determined by detecting a direction of gravity being oriented substantially orthogonally with a major surface of the electronic device.

It should be noted that FIG. 8 illustrates just a few explanatory trigger events 800 that can be used in accordance with embodiments of the disclosure. Numerous others will be obvious to those of ordinary skill in the art having the benefit of this disclosure. Illustrating by example, if an object of interest being scanned was detected to be in an orientation other than what would be expected for a given device orientation, the features of the disclosure could be actuated. This can occur even in situations where the device orientation is known. If, for instance, a user were holding an electronic device in a landscape orientation that was resolved and positively detected by the orientation detector, and the image was of a sunset with the horizon running from top to bottom of the landscape image, the one or more processors may employ embodiments of the disclosure to confirm that this orientation corresponds to the orientation of the user's head or torso, and so forth.

Figure 7:
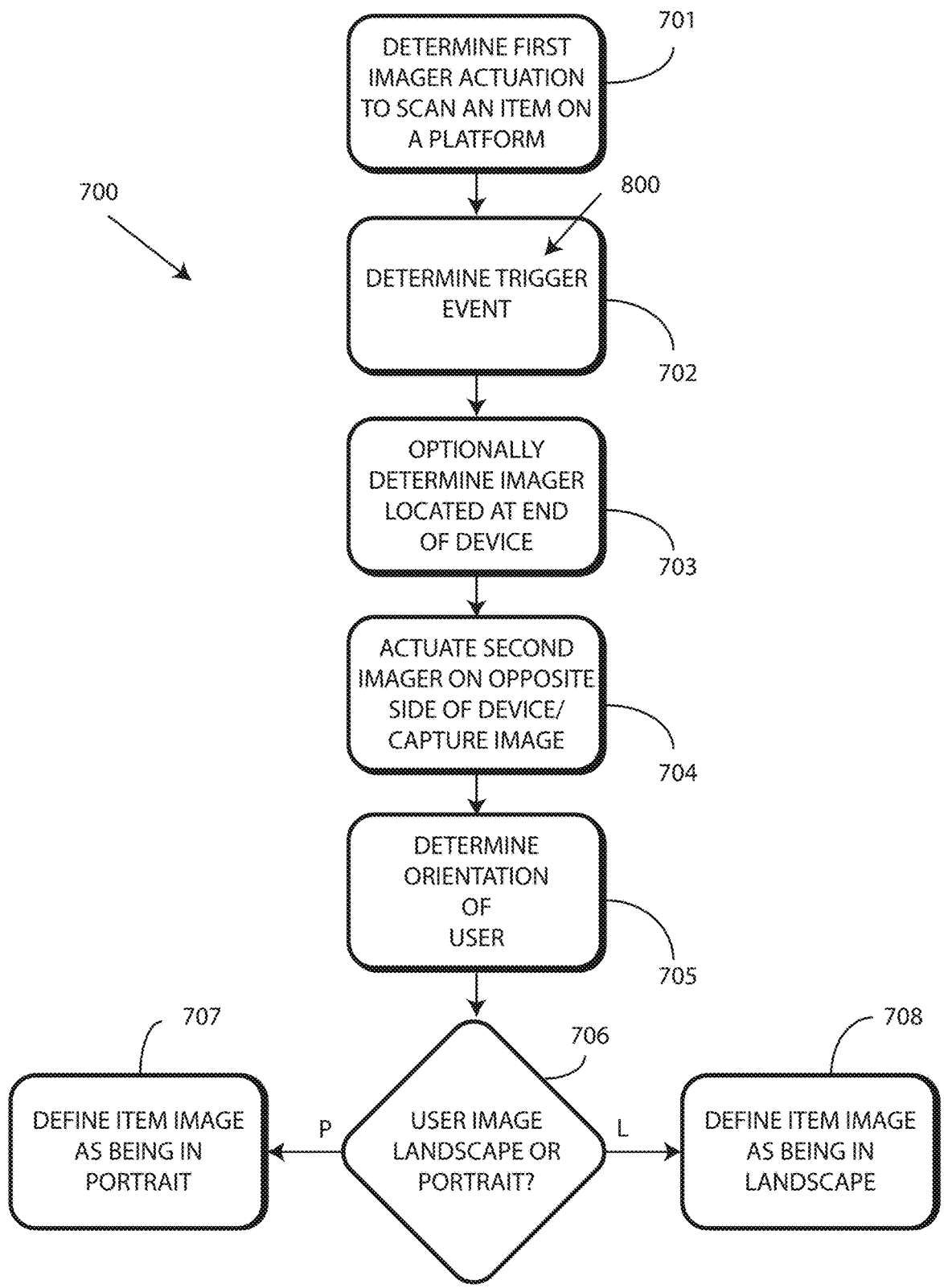
FIG. 7 illustrates another explanatory method in accordance with one or more embodiments of the disclosure.

Turning now to FIG. 7, illustrated therein is one explanatory method 700 showing how trigger events 800 can be used in conjunction with the methods of the disclosure. The purpose of FIG. 7 is to illustrate how the trigger event 800 can be inserted into such a methods. Thus, while only shown in the method 700 of FIG. 7, those of ordinary skill in the art having the benefit of this disclosure will readily appreciate and understand how the trigger event 800 step can be inserted into any of the other methods described herein, including the method (300) of FIG. 3, the method depicted in FIG. 5, the method (100) of FIGS. 1A-B, or the method (600) of FIGS. 6A-B, with minimal experimentation.

In one or more embodiments, an electronic device suitable for use with the method 700 of FIG. 7 includes a device housing having a front side and a rear side. In one or more embodiments, a first image capture device is positioned on the front side, while a second image capture device is positioned on the rear side. A user interface can be positioned on the front side or rear side and can be proximally located with the corresponding image capture device.

The electronic device includes one or more processors. In one or more embodiments, the one or more processors cause, at step 704 and in response to user input received at the user interface requesting the second image capture device capture an image of an object, the first image capture device to capture another image of a user delivering the user input. In one or more embodiments, the one or more processors then define, at step 705, an image orientation of the image of the object to be the same as another image orientation of the other image of the user. If the orientation of the image of the user is the portrait image orientation, the one or more processors define the image of the object to be in the portrait image orientation as well. If the orientation of the image of the user is the landscape image orientation, the one or more processors define the image of the object to be in the landscape image orientation, and so forth.

In one or more embodiments, as evidenced by step 702, this "second image of the user" feature is only occurs at some times, and does not occur at others. The trigger event 800 detected at step 703 can take a variety of forms, including any of those described above with reference to FIG. 8.

Illustrating by example, the use of the image of the user to determine the image orientation of the image of the object can occur only in response to a triggering event in some embodiments. If, for example, an orientation detector of the electronic device determines that the electronic device is being held substantially horizontally in three-dimensional space, the method may be implemented. Similarly, if the orientation detector is incapable of resolving the orientation of the electronic device relative to the document, an image of the user may be performed, and so forth.

Beginning at step 701, in one or more embodiments one or more processors determine that a first image capture device has been actuated to scan a document placed on a scanning platform, examples of which include tables or other horizontal surfaces. At step 702, the one or more processors detect a trigger event 800. Illustrating by example, in one embodiment the one or more processors can determine, at step 702 from signals from one or more orientation detectors, that the electronic device is being held substantially horizontally or in another orientation where the orientation detector is unable to accurately ascertain whether the electronic device is being held in a portrait image orientation relative to the document or a landscape image orientation relative to the document.

At step 703, the one or more processors can optionally determine that the first image capture device is situated on a major surface of the electronic device defining the opposite side of the electronic device from where the primary display or other primary user interface is situated.

At step 704, in response to detecting the trigger event 800 at step 702, the one or more processors activate a second image capture device of the electronic device to detect the face of the electronic device's user using facial recognition or other similar capabilities. In one or more embodiments, the second image capture device is a front-facing or "selfie" image capture device that is on the same side of the electronic device as the primary display or other primary user interface.

At step 705 and decision 706, using facial recognition technology or other similar techniques, the one or more processors determine an orientation of the user's face or torso relative to the orientation of the electronic device. In one or more embodiments, if the image of the user's face or torso is determined to be the portrait image orientation, at step 707 the image of the document is defined to be in the portrait image orientation. If the image of the user's face or torso is determined to be the landscape image orientation, at step 708 the image of the document is defined to be in the landscape image orientation.

Figure 10:
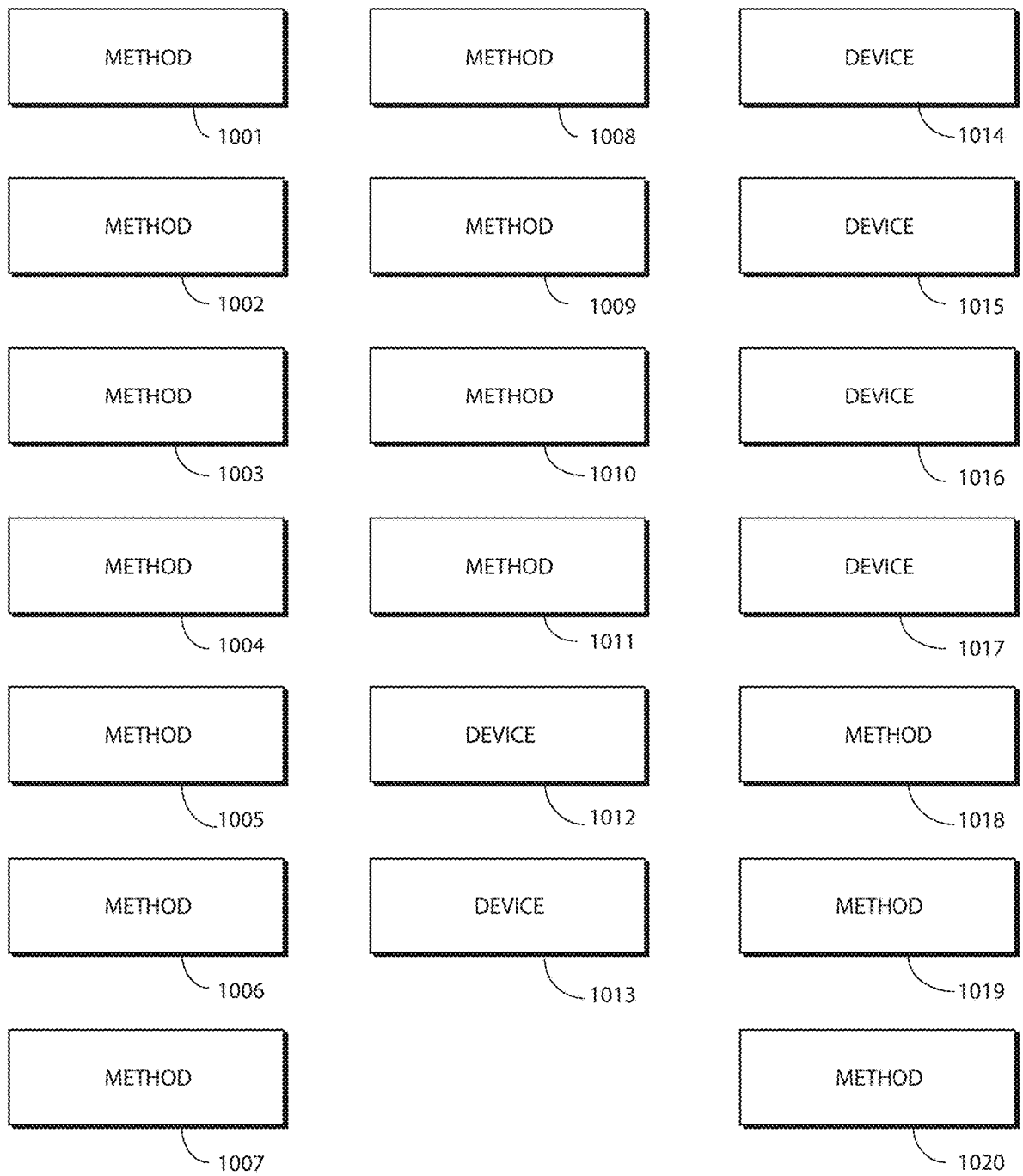
FIG. 10 illustrates various embodiments of the disclosure.

Turning now to FIG. 10, illustrated therein are various embodiments of the disclosure. The embodiments of FIG. 10 are shown as labeled boxes in FIG. 10 due to the fact that the individual components of these embodiments have been illustrated in detail in FIGS. 1-9, which precede FIG. 10. Accordingly, since these items have previously been illustrated and described, their repeated illustration is no longer essential for a proper understanding of these embodiments. Thus, the embodiments are shown as labeled boxes.

Beginning at 1001, a method in an electronic device comprises capturing, with a first image capture device situated on a first major surface of the electronic device, an image of an object. At 1001, the method also captures, with a second image capture device situated on a second major surface of the electronic device, another image of a user of the electronic device requesting the image of the object.

At 1001, the method determines, with one or more processors, an image orientation associated with the other image of the user. At 1001, the method defines, with the one or more processors, another image orientation associated with the image of the object to be the same as the image orientation associated with the other image of the user.

At 1002, the image orientation of 1001 associated with the other image of the user comprises a portrait image orientation. At 1002, the definition of the other image orientation associated with the image of the object comprises defining the other image orientation associated with the image of the object to be the portrait image orientation.

At 1003, the image orientation of 1001 associated with the other image of the user comprises a landscape image orientation. At 1003, the definition of the other image orientation associated with the image of the object comprises defining the other image orientation associated with the image of the object to be the landscape image orientation.

At 1004, the capturing of the other image of the user of the electronic device requesting the image of the object of 1001 occurs during the capturing of the image of the object.

At 1005, the determination of the image orientation associated with the other image of the user of 1001 comprises determining an orientation of a depiction of a head of the user relative to an aspect ratio of the another image of the user.

At 1006, the determination of the image orientation associated with the other image of the user of 1001 comprises determining an orientation of a depiction of a facial feature of the user relative to an aspect ratio of the another image of the user.

At 1007, the definition of 1001 of the other image orientation associated with the image of the object to be the same as the image orientation associated with the other image of the user results in text present on the object running from a top to a bottom of the image of the object.

At 1008, the capture of the other image of the user of the electronic device requesting the image of the object at 1001 occurs in response to one or more sensors of the electronic device detecting the first major face being oriented substantially orthogonally in three-dimensional space relative to a direction of gravity.

At 1009, the capture of the other image of the user of the electronic device requesting the image of the object at 1001 occurs only when the object is a document.

At 1010, the definition of 1009 of the other image orientation associated with the image of the object to be the same as the image orientation associated with the other image of the user occurs only when the document is devoid of text.

At 1011, the capture of the other image of a user of the electronic device requesting the image of the object at 1001 occurs in response to the one or more processors failing to detect an orientation of text appearing in the image of the object.

At 1012, an electronic device comprises a device housing having a front side and a rear side. At 1012, the electronic device comprises a first image capture device positioned on the front side and a second image capture device positioned on the rear side. At 1012, the electronic device comprises a user interface and one or more processors.

At 1012, the one or more processors cause, in response to user input received at the user interface requesting the second image capture device capture an image of an object, the first image capture device to capture another image of a user delivering the user input and defining an image orientation of the image of the object to be the same as other image orientation of the other image of the user. At 1013, the image orientation of 1012 consists of a landscape image orientation.

At 1014, the electronic device of 1012 further comprises an orientation detector operable with the one or more processors. At 1014, the one or more processors cause the first image capture device to capture the other image of the user when the orientation detector determines that the electronic device is being held substantially horizontally in three-dimensional space.

At 1015, the electronic device of 1012 comprises an orientation detector operable with the one or more processors. At 1015, the device housing defines a top edge, a bottom edge, and one or more side edges. At 1015, the one or more processors cause the first image capture device to capture the other image of the user when the orientation detector fails to positively detect which of the top edge, the bottom edge, or the one or more side edges is positioned at a higher elevation in three-dimensional space.

At 1016, the user input of 1012 requesting the image of the object requests the object be scanned. At 1017, the electronic device of 1012 comprises at least one display collocated with the first image capture device on the front side of the electronic device.

At 1018, a method in an electronic device comprises receiving user input at a user interface of the electronic device requesting a scanning operation be performed by an image capture device of the electronic device. At 1018, the method comprises initiating the scanning operation using the image capture device to scan an object situated within a field of view of the image capture device.

At 1018, the method comprises detecting, with one or more sensors, a triggering event. At 1018, the method comprises capturing, with another image capture device of the electronic device in response to detecting the triggering event, an image of a source of the user input.

At 1018, the method comprises determining, with one or more processors, whether the image of the source is in a portrait orientation or a landscape orientation. At 1018, the method comprises causing, by the one or more processors, the scan of the object to have an image orientation that is the same as that of the image of the source.

At 1019, the triggering event of 1018 comprises the electronic device being held horizontally in three-dimensional space. At 1020, the capturing the image of the source of the user input at 1019 occurs concurrently with the scanning operation.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    capturing, with a first image capture device situated on a first major surface of the electronic device, an image of an object;
    also capturing, with a second image capture device situated on a second major surface of the electronic device, another image of a user of the electronic device requesting the image of the object;

determining, with one or more processors, an image orientation associated with the another image of the user; and defining, with the one or more processors, another image orientation associated with the image of the object to be the same as the image orientation associated with the another image of the user.

2. The method of claim 1, wherein when the image orientation associated with the another image of the user comprises a portrait image orientation, the defining the another image orientation associated with the image of the object comprises defining the another image orientation associated with the image of the object to be the portrait image orientation.

3. The method of claim 1, wherein when the image orientation associated with the another image of the user comprises a landscape image orientation, the defining the another image orientation associated with the image of the object comprises defining the another image orientation associated with the image of the object to be the landscape image orientation.

4. The method of claim 1 wherein the capturing of the another image of a user of the electronic device requesting the image of the object occurs during the capturing of the image of the object.

5. The method of claim 1, wherein the determining the image orientation associated with the another image of the user comprises determining an orientation of a depiction of a head of the user relative to an aspect ratio of the another image of the user.

6. The method of claim 1, wherein the determining the image orientation associated with the another image of the user comprises determining an orientation of a depiction of a facial feature of the user relative to an aspect ratio of the another image of the user.

7. The method of claim 1, wherein the defining the another image orientation associated with the image of the object to be the same as the image orientation associated with the another image of the user results in text present on the object running from a top to a bottom of the image of the object.

8. The method of claim 1, wherein the capturing of the another image of a user of the electronic device requesting the image of the object occurs in response to one or more sensors of the electronic device detecting the first major surface being oriented substantially orthogonally in three-dimensional space relative to a direction of gravity.

9. The method of claim 1, wherein the defining the another image orientation associated with the image of the object to be the same as the image orientation associated with the another image of the user occurs only when the object is a document.

10. The method of claim 9, wherein the defining the another image orientation associated with the image of the object to be the same as the image orientation associated with the another image of the user occurs only when the document is devoid of text.

11. The method of claim 1, wherein the capturing of the another image of a user of the electronic device requesting the image of the object occurs in response to the one or more processors failing to detect an orientation of text appearing in the image of the object.

12. An electronic device, comprising:
a device housing having a front side and a rear side;
a first image capture device positioned on the front side;
a second image capture device positioned on the rear side;
a user interface; and
one or more processors;
the one or more processors causing, in response to user input received at the user interface requesting the second image capture device capture an image of an object, the first image capture device to capture another image of a user delivering the user input and defining an image orientation of the image of the object to be the same as another image orientation of the another image of the user.

13. The electronic device of claim 12, wherein the image orientation consists of a landscape image orientation.

14. The electronic device of claim 12, further comprising an orientation detector operable with the one or more processors, the one or more processors causing the first image capture device to capture the another image of the user when the orientation detector determines that the electronic device is being held substantially horizontally in three-dimensional space.

15. The electronic device of claim 12, further comprising an orientation detector operable with the one or more processors, wherein:
the device housing defines a top edge, a bottom edge, and one or more side edges; and
the one or more processors cause the first image capture device to capture the another image of the user when the orientation detector fails to positively detect which of the top edge, the bottom edge, or the one or more side edges is positioned at a higher elevation in three-dimensional space.

16. The electronic device of claim 12, wherein the user input requesting the image of the object requests the object be scanned.

17. The electronic device of claim 12, further comprising at least one display collocated with the first image capture device on the front side of the electronic device.

* * * * *